US012152631B2

(12) United States Patent
Tokunaga

(10) Patent No.: US 12,152,631 B2
(45) Date of Patent: Nov. 26, 2024

(54) SLIDING MEMBER

(71) Applicant: EAGLE INDUSTRY CO., LTD., Tokyo (JP)

(72) Inventor: Yuichiro Tokunaga, Tokyo (JP)

(73) Assignee: EAGLE INDUSTRY CO., LTD. (JP)

(*) Notice: Subject to any disclaimer, the term of this patent is extended or adjusted under 35 U.S.C. 154(b) by 739 days.

(21) Appl. No.: 17/277,282

(22) PCT Filed: Oct. 11, 2019

(86) PCT No.: PCT/JP2019/040209
§ 371 (c)(1),
(2) Date: Mar. 17, 2021

(87) PCT Pub. No.: WO2020/085122
PCT Pub. Date: Apr. 30, 2020

(65) Prior Publication Data
US 2021/0355992 A1    Nov. 18, 2021

(30) Foreign Application Priority Data
Oct. 24, 2018 (JP) .................. 2018-200450

(51) Int. Cl.
*F16C 17/10* (2006.01)
*F16J 15/34* (2006.01)
(52) U.S. Cl.
CPC ......... *F16C 17/102* (2013.01); *F16J 15/3424* (2013.01)

(58) Field of Classification Search
CPC ...... F16J 15/3424; F16J 15/34; F16J 15/3404; F16J 15/3408; F16J 15/3412; F16J 15/3416; F16C 17/102
See application file for complete search history.

(56) References Cited

U.S. PATENT DOCUMENTS

| 3,085,808 A | 4/1963 | Williams ............... 277/388 |
| 3,232,680 A | 2/1966 | Clark ................... 384/110 |
| 3,410,565 A | 11/1968 | Williams ............... 277/348 |
| 3,466,052 A | 9/1969 | Ludwig | |

(Continued)

FOREIGN PATENT DOCUMENTS

| CN | 1364987 | 8/2002 | ............... F16J 15/40 |
| CN | 2534429 | 2/2003 | ............... F16J 15/40 |

(Continued)

OTHER PUBLICATIONS

Chinese Office Action issued in application No. 201980065303.2 (with translation), dated Oct. 10, 2022 (13 pgs).

(Continued)

*Primary Examiner* — Gilbert Y Lee
(74) *Attorney, Agent, or Firm* — HAYES SOLOWAY P.C.

(57) ABSTRACT

A pair of sliding members sliding relative to each other at sliding faces is configured such that at least one of the sliding faces (S) includes a negative pressure generation mechanism (41) surrounded by a land portion and a branched portion (42) arranged in the sliding face S and branched from the negative pressure generation mechanism (41). The sliding members can be formed compact and is applicable to equipment for rotation in both directions, while sliding torque reduction and sealing function improvement can be realized.

21 Claims, 9 Drawing Sheets

(56) References Cited

U.S. PATENT DOCUMENTS

| | | | |
|---|---|---|---|
| 3,499,653 A | 3/1970 | Gardner | 277/27 |
| 3,527,465 A | 9/1970 | Guinard | 277/400 |
| 3,656,227 A | 4/1972 | Weinand | 29/530 |
| 3,675,935 A | 7/1972 | Ludwig | F16J 15/342 |
| 3,782,737 A | 1/1974 | Ludwig | |
| 3,804,424 A | 4/1974 | Gardner | 277/27 |
| 3,855,624 A | 12/1974 | Reinhoudt | F16C 17/045 |
| 3,870,382 A | 3/1975 | Reinhoudt | F16C 17/045 |
| 4,406,466 A | 9/1983 | Geary, Jr. | 277/347 |
| 4,486,026 A | 12/1984 | Furumura et al. | 277/80 |
| 4,523,764 A | 6/1985 | Albers | F06J 15/342 |
| 4,645,414 A | 2/1987 | DeHart | F04D 17/161 |
| 5,092,612 A | 3/1992 | Victor | 277/400 |
| 5,133,562 A | 7/1992 | Lipschitz | F16J 15/342 |
| 5,201,531 A | 4/1993 | Lai | F16J 15/3412 |
| 5,222,743 A | 6/1993 | Goldswain | 277/400 |
| 5,385,409 A | 1/1995 | Ide | F16J 15/3432 |
| 5,441,283 A | 8/1995 | Pecht et al. | 277/96.1 |
| 5,447,316 A | 9/1995 | Matsui | F16J 15/34 |
| 5,492,341 A | 2/1996 | Pecht | 277/400 |
| 5,496,047 A | 3/1996 | Goldswain | F16J 15/3412 |
| 5,498,007 A | 3/1996 | Kulkarni | 277/366 |
| 5,501,470 A | 3/1996 | Fuse | 277/400 |
| 5,529,318 A | 6/1996 | Fuse | F16J 15/3412 |
| 5,556,111 A | 9/1996 | Sedy | 277/96.1 |
| 5,605,339 A | 2/1997 | Pecht | F16J 15/3412 |
| 5,664,787 A | 9/1997 | Fuse et al. | F16J 15/34 |
| 5,702,110 A | 12/1997 | Sedy | |
| 5,895,051 A | 4/1999 | Bowers | B62D 5/22 |
| 6,142,478 A | 11/2000 | Pecht | F16J 15/3484 |
| 6,189,896 B1 | 2/2001 | Dickey et al. | F16L 17/06 |
| 6,446,976 B1 | 9/2002 | Key | 277/367 |
| 6,575,470 B1 | 6/2003 | Gacek | F16J 15/3412 |
| 6,817,766 B2 | 11/2004 | Gomyo | F16C 32/06 |
| 7,044,470 B2 | 5/2006 | Zheng | F16J 15/342 |
| 7,510,330 B2 | 3/2009 | Obara | F16C 32/06 |
| 7,568,839 B2 | 8/2009 | Gotoh et al. | F16C 32/06 |
| 7,744,094 B2 | 6/2010 | Yanagisawa | F16J 15/342 |
| 7,758,051 B2 | 7/2010 | Roberts-Haritonov et al. F16J 15/34 | |
| 7,780,399 B1 | 8/2010 | Garrison | F01D 25/183 |
| 8,162,322 B2 | 4/2012 | Flaherty | F16J 15/3412 |
| 9,062,775 B2 | 6/2015 | Short et al. | F16J 15/34 |
| 9,353,865 B2 | 5/2016 | Lattin | F16N 21/00 |
| 9,353,867 B2 | 5/2016 | Itadani | F16J 15/342 |
| 9,371,912 B2 | 6/2016 | Hosoe et al. | F16J 15/34 |
| 9,587,745 B2 | 3/2017 | Itadani et al. | F16J 15/3412 |
| 9,611,938 B1 | 4/2017 | Itadani | F16J 15/3416 |
| 9,677,670 B2 | 6/2017 | Itadani et al. | F16J 15/34 |
| 9,829,109 B2 | 11/2017 | Itadani et al. | F16J 15/3432 |
| 9,845,886 B2 | 12/2017 | Itadani | F16C 17/045 |
| 9,951,873 B2 | 4/2018 | Inoue et al. | F16J 15/34 |
| 9,982,784 B2 | 5/2018 | Osada et al. | F16J 15/34 |
| 10,054,230 B2 | 8/2018 | Katori | F16J 15/34 |
| 10,072,759 B2 | 9/2018 | Inoue et al. | F16J 15/34 |
| 10,113,648 B2 | 10/2018 | Inoue et al. | F16J 15/342 |
| 10,190,689 B2 | 1/2019 | Yoshida | F16J 15/3412 |
| 10,337,560 B2 | 7/2019 | Takunaga | F16C 33/80 |
| 10,337,620 B2 | 7/2019 | Tokunaga et al. | F16J 15/342 |
| 10,352,450 B2 | 7/2019 | Yamanaka et al. | F16J 15/3204 |
| 10,408,349 B2 | 9/2019 | Miyazaki | F16J 15/3272 |
| 10,473,220 B2 | 11/2019 | Tokunaga et al. | F16J 15/34 |
| 10,487,944 B2 | 11/2019 | Itadani | F16J 15/3496 |
| 10,487,948 B2 | 11/2019 | Inoue et al. | F16J 15/342 |
| 10,495,228 B2 | 12/2019 | Itadani et al. | F16J 15/34 |
| 10,648,569 B2 | 5/2020 | Itadani | F16K 15/34 |
| 10,655,736 B2 | 5/2020 | Itadani | F16J 15/3416 |
| 10,704,417 B2 | 7/2020 | Tokunaga et al. | F01D 25/16 |
| 10,781,924 B2 | 9/2020 | Inoue et al. | F16J 15/342 |
| 10,883,603 B2 | 1/2021 | Inoue et al. | F16J 15/342 |
| 10,883,604 B2 | 1/2021 | Inoue et al. | F16J 15/342 |
| 11,009,072 B2 | 5/2021 | Kimura et al. | F16J 15/34 |
| 11,009,130 B2 | 5/2021 | Itadani | F16J 15/3284 |
| 11,125,335 B2 | 9/2021 | Kimura et al. | F16J 15/34 |
| 11,221,071 B2 | 1/2022 | Sasaki | F16C 17/04 |
| 11,525,512 B2 | 12/2022 | Kimura | F16J 15/3412 |
| 11,530,749 B2 | 12/2022 | Kimura | F16J 15/447 |
| 11,603,934 B2 | 3/2023 | Imura | F16J 15/3412 |
| 11,644,100 B2 | 5/2023 | Kimura | F16J 15/324 |
| 2002/0093141 A1 | 7/2002 | Wang | 277/358 |
| 2003/0178781 A1 | 9/2003 | Tejima | |
| 2004/0080112 A1 | 4/2004 | Tejima | 277/306 |
| 2005/0135714 A1 | 6/2005 | Rahman | F16C 17/107 |
| 2005/0141789 A1 | 6/2005 | Kita et al. | F16C 32/06 |
| 2005/0212217 A1 | 9/2005 | Tejima | 277/399 |
| 2006/0093245 A1 | 5/2006 | Han | G11B 19/2018 |
| 2007/0296156 A1 | 12/2007 | Yanagisawa et al. | F16J 15/34 |
| 2008/0100001 A1 | 5/2008 | Flaherty | 277/400 |
| 2008/0272552 A1 | 11/2008 | Zheng | 277/400 |
| 2010/0066027 A1 | 3/2010 | Vasagar | 277/350 |
| 2011/0101616 A1 | 5/2011 | Teshima | 277/358 |
| 2012/0018957 A1 | 1/2012 | Watanabe | 277/387 |
| 2013/0189294 A1 | 7/2013 | Koelle et al. | F16J 15/34 |
| 2013/0209011 A1 | 8/2013 | Tokunaga | |
| 2014/0203517 A1 | 7/2014 | Ferris | F16K 15/3412 |
| 2015/0115537 A1* | 4/2015 | Tokunaga | F16J 15/3412 277/348 |
| 2015/0115540 A1 | 4/2015 | Tokunaga | F16J 15/34 |
| 2015/0123350 A1 | 5/2015 | Itadani | 277/400 |
| 2015/0184752 A1 | 7/2015 | Itadani | F16J 15/3412 |
| 2015/0226334 A1 | 8/2015 | Itadani | F16J 15/342 |
| 2015/0240950 A1 | 8/2015 | Takahashi | F16J 15/363 |
| 2015/0260292 A1 | 9/2015 | Inoue et al. | F16J 15/342 |
| 2015/0377297 A1 | 12/2015 | Tokunaga et al. | F16C 33/748 |
| 2015/0377360 A1 | 12/2015 | Itadani | F16J 15/3412 |
| 2016/0003361 A1 | 1/2016 | Takahashi | F16J 15/3408 |
| 2016/0033045 A1 | 2/2016 | Itadani et al. | |
| 2016/0097457 A1 | 4/2016 | Sun et al. | F16J 15/34 |
| 2016/0252182 A1 | 9/2016 | Itadani et al. | F16J 15/34 |
| 2017/0009889 A1 | 1/2017 | Seki | F16J 15/3272 |
| 2017/0114902 A1 | 4/2017 | Itadani | F16J 15/3412 |
| 2017/0130844 A1 | 5/2017 | Itadani | F16J 15/3412 |
| 2017/0167615 A1* | 6/2017 | Itadani | F16J 15/3412 |
| 2017/0198814 A1 | 7/2017 | Colombo et al. | F16J 15/3412 |
| 2017/0234431 A1 | 8/2017 | Katori et al. | F16J 15/3412 |
| 2017/0241549 A1* | 8/2017 | Itadani | F16J 15/40 |
| 2018/0051809 A1 | 2/2018 | Yoshida | F16J 15/3412 |
| 2018/0058584 A1 | 3/2018 | Miyazaki | F16J 15/164 |
| 2018/0073394 A1 | 3/2018 | Tokunaga et al. | F01D 25/183 |
| 2018/0128377 A1 | 5/2018 | Tokunaga et al. | F16J 15/342 |
| 2018/0128378 A1 | 5/2018 | Tokunaga et al. | F16J 15/342 |
| 2018/0135699 A1 | 5/2018 | Takunaga | F16J 15/348 |
| 2018/0195618 A1 | 7/2018 | Itadani | F16J 15/342 |
| 2019/0178386 A1 | 6/2019 | Arai | F16J 15/3496 |
| 2019/0301522 A1 | 10/2019 | Negishi et al. | F16C 17/026 |
| 2019/0376558 A1 | 12/2019 | Kimura | F16C 33/743 |
| 2020/0182299 A1 | 6/2020 | Kimura | F16C 17/026 |
| 2021/0054935 A1 | 2/2021 | Kimura | F16J 15/3412 |
| 2021/0080006 A1 | 3/2021 | Sasaki | F16J 15/34 |
| 2021/0116029 A1 | 4/2021 | Kimura | F16J 15/324 |
| 2021/0116030 A1 | 4/2021 | Kimura | F16J 15/3412 |
| 2021/0116032 A1 | 4/2021 | Kimura | F16J 15/188 |
| 2021/0164571 A1 | 6/2021 | Kimura | F16J 15/3412 |
| 2022/0010835 A1 | 1/2022 | Inoue | F16C 17/045 |
| 2022/0099191 A1 | 3/2022 | Suzuki | F16C 33/103 |
| 2022/0145992 A1 | 5/2022 | Miyazaki | F16C 33/107 |
| 2022/0275828 A1 | 9/2022 | Inoue | F16J 15/3424 |
| 2023/0258184 A1 | 8/2023 | Suzuki | F04C 29/00 |

FOREIGN PATENT DOCUMENTS

| | | | |
|---|---|---|---|
| CN | 1401924 | 3/2003 | F16J 15/16 |
| CN | 101749431 | 6/2010 | F16J 15/34 |
| CN | 101776152 | 7/2010 | F16J 15/48 |
| CN | 201582390 | 9/2010 | F16J 15/16 |
| CN | 103267132 | 8/2013 | F16J 15/54 |
| CN | 103732958 | 4/2014 | F16J 15/34 |
| CN | 103791097 | 5/2014 | F16J 15/34 |
| CN | 104019237 | 9/2014 | F16J 15/16 |
| CN | 104165229 | 11/2014 | F16J 15/40 |
| CN | 105683632 | 6/2016 | F04D 29/10 |
| CN | 106439037 | 2/2017 | F16J 15/34 |
| CN | 206017723 | 3/2017 | F16J 15/16 |
| CN | 107166036 | 9/2017 | F16J 15/16 |

(56) References Cited

FOREIGN PATENT DOCUMENTS

| | | | |
|---|---|---|---|
| CN | 107532724 | 1/2018 | ............... F16J 15/34 |
| CN | 107676484 | 2/2018 | ............ F16J 15/3232 |
| CN | 108506494 | 9/2018 | ............... F16J 15/34 |
| DE | 36 19 489 | 12/1987 | ............... F16J 15/34 |
| DE | 4407453 | 9/1995 | ............... F16C 17/08 |
| EP | 0637706 | 8/1993 | ............... F16J 15/34 |
| EP | 0896163 | 2/1999 | ............... F16C 33/10 |
| EP | 2520835 | 11/2012 | ............... F16J 15/34 |
| EP | 2626604 | 8/2013 | ............... F16J 15/34 |
| EP | 2977655 | 1/2016 | ............... F16J 15/34 |
| EP | 3091258 | 11/2016 | ............... F16J 15/34 |
| EP | 3299686 | 3/2018 | ............... F16J 15/34 |
| EP | 3514414 | 7/2019 | ............... F16J 15/34 |
| EP | 3922872 | 12/2021 | ............... F16J 15/34 |
| EP | 3926187 | 12/2021 | ............... F16C 17/04 |
| EP | 3926188 | 12/2021 | ............... F16C 17/04 |
| EP | 3943765 | 1/2022 | ............... F16C 17/04 |
| GB | 1509482 | 5/1978 | ............... F16C 33/10 |
| JP | 36-6305 | 5/1961 | |
| JP | S49-33614 | 9/1974 | ............... F16J 15/34 |
| JP | S54-77305 | 6/1979 | ............... B60B 9/10 |
| JP | S55-177549 | 12/1980 | ............... F16J 15/16 |
| JP | S57-146955 | 9/1982 | ............... F16J 15/34 |
| JP | 58-109771 | 6/1983 | ............... F16J 15/34 |
| JP | 58-137667 | 8/1983 | ............... F16J 15/40 |
| JP | S59-58252 | 4/1984 | ............... F16J 15/34 |
| JP | S60-107461 | 7/1985 | ............... B63H 23/36 |
| JP | S6182177 | 5/1986 | ............... F16J 15/34 |
| JP | S62-37572 | 2/1987 | ............... F16J 51/34 |
| JP | S63-033027 | 3/1988 | ............... F16C 33/46 |
| JP | S63-190975 | 8/1988 | ............... F16J 15/34 |
| JP | H01133572 | 9/1989 | ............... F16J 15/34 |
| JP | 2-236067 | 9/1990 | ............... F16J 15/34 |
| JP | 3-14371 | 2/1991 | ............... F16J 15/34 |
| JP | 3-35372 | 4/1991 | ............... F16J 15/34 |
| JP | 3-41267 | 4/1991 | ............... F16J 15/34 |
| JP | 3-41268 | 4/1991 | ............... F16J 15/34 |
| JP | H04-73 | 1/1992 | ............... F16J 15/34 |
| JP | H04-145267 | 5/1992 | ............... F16J 15/34 |
| JP | H04-96671 | 8/1992 | ............... F16J 15/34 |
| JP | H05-90048 | 12/1993 | ............... F16J 15/34 |
| JP | H05322050 A | 12/1993 | |
| JP | H07-55016 | 3/1995 | ............... F16J 15/34 |
| JP | H08-89489 | 4/1996 | ............... A61B 5/05 |
| JP | H09-503276 | 3/1997 | ............... F16J 15/34 |
| JP | H09-329247 | 12/1997 | ............... F16J 15/34 |
| JP | H10-38093 | 2/1998 | ............... F16J 15/34 |
| JP | H10-281299 | 10/1998 | ............... F16J 15/34 |
| JP | 2000-179543 | 6/2000 | ............... F16C 17/10 |
| JP | 2001-295833 | 10/2001 | ............... F16C 17/04 |
| JP | 2001-317638 | 11/2001 | ............... F16J 15/34 |
| JP | 2003-161322 | 6/2003 | ............... F16C 33/10 |
| JP | 2003-343741 | 12/2003 | ............... F16J 15/34 |
| JP | 2004-003578 | 1/2004 | ............... F16J 15/34 |
| JP | 2005-188651 | 7/2005 | ............... F16J 15/34 |
| JP | 2005-58051 | 12/2005 | ............... F16C 33/74 |
| JP | 2006-9828 | 1/2006 | ............... F16C 17/02 |
| JP | 2006-022834 | 1/2006 | ............... F16J 15/34 |
| JP | 2006-77899 | 3/2006 | ............... F16J 15/34 |
| JP | 2008-144864 | 6/2008 | ............... F16C 33/10 |
| JP | 2009-250378 | 10/2009 | ............... F16J 15/34 |
| JP | 2010-133496 | 6/2010 | ............... F16J 15/34 |
| JP | 2010-216587 | 9/2010 | ............... F16J 15/34 |
| JP | 2011-185292 | 9/2011 | ............... F16J 15/34 |
| JP | 2011196429 | 10/2011 | ............... F16J 15/34 |
| JP | 2012-2295 | 1/2012 | ............... F16J 15/34 |
| JP | 5271858 | 5/2013 | ............... F16J 15/34 |
| JP | WO2014042045 | 3/2014 | ............... F16J 15/34 |
| JP | 2016-80090 | 5/2016 | ............... F16J 15/34 |
| JP | 2017-141961 | 8/2017 | ............... F16J 15/34 |
| JP | 6444492 | 12/2018 | ............... F16J 15/34 |
| JP | 2019-15401 | 1/2019 | ............... F16J 15/34 |
| JP | 201913446 | 1/2019 | ............... A47J 27/00 |
| WO | WO 95/06832 | 3/1995 | ............... F16J 15/34 |
| WO | 2012046749 A1 | 4/2012 | |
| WO | WO 2014/024742 | 2/2014 | ............... F16J 15/34 |
| WO | 2014050920 A1 | 4/2014 | |
| WO | WO 2014/103630 | 7/2014 | ............... F16J 15/34 |
| WO | WO 2014/112455 | 7/2014 | ............... F16J 15/34 |
| WO | WO2014103631 | 7/2014 | ............... F16J 15/34 |
| WO | WO 2014/148316 | 9/2014 | ............... F16J 15/34 |
| WO | 2014174725 A1 | 10/2014 | |
| WO | WO 2016/009408 | 1/2016 | ............... F16J 15/34 |
| WO | WO 2016/035860 | 3/2016 | ............... F16J 15/34 |
| WO | WO 2016/167262 | 10/2016 | ............... F16J 15/34 |
| WO | WO 2016/186019 | 11/2016 | ............... F16J 15/34 |
| WO | WO2016203878 | 12/2016 | ............... F16J 15/34 |
| WO | WO 2017/002774 | 1/2017 | ............... F16J 15/34 |
| WO | WO 2018/034197 | 2/2018 | ............... F16J 15/34 |
| WO | WO 2018/105505 | 6/2018 | ............... F16J 15/34 |
| WO | WO2018139231 | 8/2018 | ............... F16J 15/34 |
| WO | WO2018139232 | 8/2018 | ............... F16C 33/10 |

OTHER PUBLICATIONS

European Official Action issued in related European Patent Application Serial No. 19914452.8, dated Oct. 5, 2022, 10 pages.
European Official Action issued in related European Patent Application Serial No. 20756664.7, dated Oct. 14, 2022, 8 pages.
European Official Action issued in related European Patent Application Serial No. 20759684.2, dated Oct. 17, 2022, 7 pages.
Korean Office Action issued in application No. 10-2021-7019130 (with translation), dated Oct. 22, 2022 (13 pgs).
Korean Office Action issued in application No. 10-2021-7007194 (with translation), dated Nov. 7, 2022 (14 pgs).
Korean Office Action issued in application No. 10-2021-7009776 (with translation), dated Dec. 12, 2022 (19 pgs).
Notice of Allowance issued in U.S. Appl. No. 17/257,260, dated Nov. 23, 2022, 9 pages.
Chinese Office Action issued in application No. 201980082245.4 (with translation), dated Aug. 3, 2023, 25 pages.
European Official Action issued in application No. 19876680.0, dated Aug. 24, 2023, 8 pages.
Korean Official Action issued in Korean Patent Application Serial No. 10-2022-7002564, dated Jun. 27, 2023, 11 pages with translation.
Korean Official Action issued in Korean Patent Application Serial No. 10-2021-7028347, dated Jun. 22, 2023, 11 pages with translation.
Korean Official Action issued in Korean Patent Application Serial No. 10-2021-7009776, dated Jun. 28, 2023, 8 pages with translation.
Official Action issued in related U.S. Appl. No. 17/420,660, dated Sep. 13, 2023, 10 pages.
Notice of Allowance issued in related U.S. Appl. No. 17/296,466, dated Jul. 24, 2023, 11 pages.
Notice of Allowance issued in related U.S. Appl. No. 17/259,336, dated Sep. 19, 2023, 8 pages.
Chinese Office Action issued in application No. 201980076998.4 (with translation), dated Jan. 18, 2023, 12 pages.
Chinese Office Action issued in application No. 201980059152.X (with translation), dated Oct. 10, 2022, 14 pages.
Chinese Office Action issued in application No. 202080012994.2(with translation), dated Feb. 2, 2023, 13 pages.
Chinese Office Action issued in application No. 202080012994.2(with translation), dated Apr. 24, 2023, 12 pages.
Chinese Office Action issued in application No. 201980082245.4 (with translation), dated Feb. 16, 2023, 23 pages.
European Official Action issued in application No. 19869466.3, dated Mar. 16, 2023, 7 pages.
European Official Action issued in application No. 22212136.0, dated Mar. 15, 2023, 8 pages.
European Official Action issued in application No. 19850900.2, dated Mar. 28, 2023, 4 pages.
European Official Action issued in application No. 23155551.7, dated Feb. 28, 2023, 7 pages.
European Official Action issued in application No. 19888532.9, dated Mar. 7, 2023, 3 pages.

(56) References Cited

OTHER PUBLICATIONS

European Official Action issued in application No. 23158438.4, dated May 15, 2023, 11 pages.
Japanese Decision of Refusal issued in application No. 2021-502065, dated May 23, 2023, 8 pages.
Korean Official Action issued in Korean Patent Application Serial No. 10-2021-7002193, dated Jan. 11, 2023, 11 pages.
Korean Official Action issued in Korean Patent Application Serial No. 10-2021-7022185, dated Apr. 6, 2023, 12 pages.
Korean Official Action issued in Korean Patent Application Serial No. 10-2021-7016898, dated Feb. 16, 2023, 13 pages.
Official Action issued in related U.S. Appl. No. 17/413,466, dated Apr. 12, 2023, 11 pages.
Official Action issued in related U.S. Appl. No. 17/296,466, dated Apr. 12, 2023, 9 pages.
Official Action issued in related U.S. Appl. No. 17/428,909, dated Apr. 21, 2023, 8 pages.
Official Action issued in related U.S. Appl. No. 17/628,158, dated May 15, 2023, 14 pages.
Chinese Office Action issued in application No. 201980059152.X (with translation), dated May 8, 2023, 11 pages.
European Search Report issued in application No. 20847261.3, dated Jul. 17, 2023, 8 pages.
Korean Official Action issued in Korean Patent Application Serial No. 10-2021-7028879, dated Jun. 28, 2023, 10 pages.
Official Action issued in related U.S. Appl. No. 17/428,909, dated Jul. 25, 2023, 8 pages.
Notice of Allowance issued in related U.S. Appl. No. 17/296,466, dated Jul. 24, 2023, 9 pages.
Definition of groove by Merriam Webster.
Chinese Office Action issued in application No. 201380070532.6 (with translation), dated Jan. 28, 2016 (13 pgs).
Chinese Office Action issued in application No. 201380070532.6 (with translation), dated Sep. 20, 2016 (12 pgs).
Second Office Action issued by the State Intellectual Property Office of China, mailed Aug. 29, 2016, for Chinese counterpart application No. 201480002574.0, 8 pages.
First Notification of Reason for Refusal issued by the State Intellectual Property Office of China, mailed Dec. 24, 2015, with a search report for Chinese counterpart application No. 201480002574.0, 11 pages.
Office Action issued in U.S. Appl. No. 14/431,733, dated Apr. 29, 2016 (22 pgs).
Office Action issued in U.S. Appl. No. 14/431,733, dated Aug. 18, 2017 (13 pgs).
Office Action issued in U.S. Appl. No. 14/431,733, dated Mar. 31, 2017 (14 pgs).
Office Action issued in U.S. Appl. No. 14/431,733, dated Oct. 6, 2016 (12 pgs).
Office Action issued in U.S. Appl. No. 15/419,989, dated Jan. 26, 2018 (20 pgs).
Office Action issued in U.S. Appl. No. 15/419,970, dated May 11, 2018 (17 pgs).
Office Action issued in U.S. Appl. No. 15/419,970, dated Jan. 23, 2018 (21 pgs).
Office Action issued in U.S. Appl. No. 15/842,862, dated Jun. 5, 2019 (37 pgs).
Office Action issued in U.S. Appl. No. 15/842,855, dated Mar. 12, 2020 (11 pgs).
Office Action issued in U.S. Appl. No. 15/842,855, dated Jun. 29, 2020, 16 pages.
Office Action issued in U.S. Appl. No. 15/842,858, dated Mar. 31, 2020 (10 pgs).
Office Action issued in U.S. Appl. No. 15/842,859, dated Apr. 8, 2020 (12 pgs).
Notice of Allowance issued in U.S. Appl. No. 15/419,970, dated Aug. 9, 2018 (16 pgs).
Notice of Allowance issued in U.S. Appl. No. 14/431,733, dated Feb. 23, 2018 (22 pgs).
Notice of Allowance issued in U.S. Appl. No. 15/419,989, dated Jul. 23, 2018 (11 pgs).
Notice of Allowance issued in U.S. Appl. No. 15/842,862, dated Sep. 30, 2019, 15 pages.
Japanese Office Action (w/translation) issued in application 2018-159877, dated Jun. 13, 2019 (7 pgs).
International Search Report issued in application No. PCT/JP2013/084029, dated Mar. 25, 2014 (4 pgs).
International Preliminary Report on Patentability issued in application No. PCT/JP2013/084029, dated Nov. 5, 2015 (8 pgs).
International Search Report and Written Opinion issued in PCT/JP2014/050402, dated Feb. 10, 2014, with English translation, 12 pages.
International Preliminary Report on Patentability issued in PCT/JP2014/050402, dated Jul. 21, 2015, 4 pages.
International Search Report and Written Opinion issued in PCT/JP2019/045728, dated Dec. 17, 2019, with English translation, 13 pages.
International Preliminary Report on Patentability issued in PCT/JP2019/045728, dated May 25, 2021, 7 pages.
International Search Report and Written Opinion issued in PCT/JP2019/047890, dated Feb. 10, 2020, with English translation, 13 pages.
International Preliminary Report on Patentability issued in PCT/JP2019/047890, dated Aug. 10, 2021, 7 pages.
International Search Report and Written Opinion issued in PCT/JP2019/049870, dated Mar. 10, 2020, with English translation, 13 pages.
International Preliminary Report on Patentability issued in PCT/JP2019/049870, dated Jun. 16, 2021, 7 pages.
International Search Report and Written Opinion issued in PCT/JP2020/005260, dated Apr. 7, 2020, with English translation, 16 pages.
International Preliminary Report on Patentability issued in PCT/JP2020/005260, dated Aug. 10, 2021, 9 pages.
International Search Report and Written Opinion issued in PCT/JP2020/006421, dated Apr. 21, 2020, with English translation, 13 pages.
International Preliminary Report on Patentability issued in PCT/JP2020/006421, dated Aug. 10, 2021, 6 pages.
International Search Report and Written Opinion issued in PCT/JP2020/017170, dated Jun. 2, 2020, with translation, 13 pages.
International Preliminary Report on Patentability issued in PCT/JP2020/027005, dated Feb. 1, 2022, 4 pages.
International Search Report and Written Opinion issued in PCT/JP2020/027005, dated Sep. 1, 2020, with English translation, 11 pages.
International Preliminary Report on Patentability issued in PCT/JP2019/032723, dated Mar. 2, 2021, 6 pages.
International Search Report and Written Opinion issued in PCT/JP2019/032723, dated Nov. 5, 2019, with English translation, 17 pages.
International Preliminary Report on Patentability issued in PCT/JP2019/029771, dated Feb. 2, 2021, 7 pages.
International Search Report and Written Opinion issued in PCT/JP2019/029771, dated Sep. 17, 2019, with English translation, 20 pages.
International Preliminary Report on Patentability issued in PCT/JP2019/040209, dated Apr. 27, 2021, 6 pages.
International Search Report and Written Opinion issued in PCT/JP2019/040209, dated Dec. 24, 2019, with English translation, 17 pages.
International Preliminary Report on Patentability issued in PCT/JP2019/038155, dated Mar. 23, 2021, 6 pages.
International Search Report and Written Opinion issued in PCT/JP2019/038155, dated Nov. 19, 2019, with English translation, 18 pages.
Chinese Office Action issued in application No. 201980087670.2 (with translation), dated Jul. 1, 2022 (17 pgs).
Chinese Office Action issued in application No. 201980043720.7 (with translation), dated Jun. 6, 2022 (12 pgs).
Chinese Office Action issued in application No. 202080014381.2 (with translation), dated Aug. 11, 2022 (15 pgs).

(56) References Cited

OTHER PUBLICATIONS

Chinese Office Action issued in application No. 202080012994.2 (with translation), dated Aug. 29, 2022 (14 pgs).
European Official Action issued in related European Patent Application Serial No. 19869466.3, dated May 19, 2022, 9 pages.
European Official Action issued in related European Patent Application Serial No. 19876680.0, dated Jun. 3, 2022, 8 pages.
European Official Action issued in related European Patent Application Serial No. 19888532.9, dated Jul. 8, 2022, 7 pages.
European Official Action issued in related European Patent Application Serial No. 19899646.4, dated Aug. 12, 2022, 9 pages.
Korean Office Action issued in application No. 10-2020-7037305 (with translation), dated Jun. 24, 2022 (17 pgs).
Korean Office Action issued in application No. 10-2021-7002193 (with translation), dated Jul. 18, 2022 (13 pgs).
Office Action issued in U.S. Appl. No. 17/257,260, dated Jul. 6, 2022 (12 pgs).
International Search Report (ISR) mailed Dec. 24, 2019, issued for International application No. PCT/JP2019/040209. (2 pages).
European Official Action issued in related European Patent Application Serial No. 19850900.2, dated Mar. 31. 2022, 11 pages.
European Official Action issued in related European Patent Application Serial No. 19843273.4, dated Mar. 24, 2022, 9 pages.
Chinese Office Action issued in application No. 201980076998.4 (with translation), dated Sep. 29, 2023, 7 pages.
European Official Action issued in application No. 20759684.2, dated Sep. 25, 2023, 6 pages.
Korean Official Action issued in Korean Patent Application Serial No. 10-2021-7000686, dated Aug. 22, 2023, 6 pages with translation.
Official Action issued in related U.S. Appl. No. 17/429,896, dated Oct. 10, 2023, 14 pages.
U.S. Appl. No. 17/257,260, filed Dec. 30, 2020, Okada.
U.S. Appl. No. 17/259,336, filed Jan. 11, 2021, Imura.
U.S. Appl. No. 17/275,505, filed Mar. 11, 2021, Tokunaga et al.
U.S. Appl. No. 17/296,466, filed May 24, 2021, Inoue et al.
U.S. Appl. No. 17/413,466, filed Jun. 11, 2021, Imura et al.
U.S. Appl. No. 17/420,660, filed Jul. 2, 2021, Suzuki et al.
U.S. Appl. No. 17/428,909, filed Aug. 5, 2021, Tokunaga et al.
U.S. Appl. No. 17/429,896, filed Aug. 10, 2021, Suzuki et al.
U.S. Appl. No. 17/628,158, filed Jan. 18, 2022, Inoue et al.
Official Action issued in related U.S. Appl. No. 17/275,505, dated Nov. 1, 2023, 7 pages.
Official Action issued in related U.S. Appl. No. 17/275,505, dated Feb. 9, 2024, 9 pages.
Notice of Allowance issued in related U.S. Appl. No. 17/420,660 dated Feb. 14, 2024, 8 pages.
Notice of Allowance issued in related U.S. Appl. No. 17/429,896 dated Mar. 6, 2024, 10 pages.
Korean Official Action issued in related application 10-2022-7002564, dated Dec. 18, 2023, with translation 6 pages.
European Official Action issued in related application 23216949.0, dated Mar. 11, 2024, 7 pages.

* cited by examiner

SLIDING MEMBER

CROSS-REFERENCE TO RELATED APPLICATIONS

This application is the U.S. National Phase under 35 U.S.C. § 371 of International Application PCT/JP2019/040209, filed Oct. 11, 2019, which claims priority to Japanese Patent Application No. JP2018-200450, filed Oct. 24, 2018. The International Application was published under PCT Article 21(2) in a language other than English.

TECHNICAL FIELD

The present invention relates to a sliding member suitable for a mechanical seal, a bearing, and other sliding portions, for example. Specifically, the present invention relates to a sliding member for, e.g., a seal ring or a bearing for which friction on a sliding face needs to be reduced and fluid leakage from the sliding face needs to be prevented.

BACKGROUND ART

For maintaining sealability for a long period of time in a mechanical seal as one example of a sliding member, there is the technique of satisfying both of conflicting conditions of "sealing" and "lubrication." For example, a technique has been known, in which at a pair of sliding members sliding relative to each other, a positive pressure generation groove is provided on a sealed fluid side of one sliding face and a negative pressure generation groove is provided on a leakage side, and each of the positive pressure generation groove and the negative pressure generation groove is communicated with the sealed fluid side and is separated from the leakage side by a seal face (see, e.g., Patent Document 1).

When the sliding members with the above-described configuration slide relative to each other, the sliding faces are pushed out by a positive pressure generated by the positive pressure generation groove provided on the sealed fluid side, and a fluid lubrication state in which a liquid film is interposed between the sliding faces is brought. Thus, sliding torque can be reduced. Moreover, pumping action for sucking fluid into a portion between the sliding faces from the leakage side is caused utilizing a negative pressure generated by the negative pressure generation groove provided on the leakage side, and therefore, a leakage amount can be extremely small.

CITATION LIST

Patent Documents

Patent Document 1: WO 2012/046749

SUMMARY OF INVENTION

Problem to be Solved by the Invention

However, in the above-described technique, the positive pressure generation groove needs to be provided on the sealed fluid side of the sliding face, and the negative pressure generation groove needs to be provided on the leakage side. This leads to a problem that a sliding face component is increased in size. Moreover, in the case of applying the above-described technique to equipment for rotation in both directions, a dynamic pressure generation mechanism for forward rotation and a dynamic pressure generation mechanism for backward rotation need to be provided, leading to a problem that a structure is complicated.

The present invention is intended to provide a compact sliding member which is configured so that sliding torque reduction and sealing function improvement can be realized and which is applicable to equipment for rotation in both directions.

Means for Solving Problem

In order to solve the above-described problems, a sliding member of a first aspect of the present invention is
a pair of sliding members sliding relative to each other at sliding faces, characterized in that
at least one of the sliding faces includes a negative pressure generation mechanism surrounded by a land portion and
a first branched portion arranged in the at least one of the sliding faces and branched from the negative pressure generation mechanism.

According to the first aspect, cavitation occurs due to pressure reduction in the negative pressure generation mechanism, and liquid is evaporated. Thus, sliding using gas with a small viscosity is dominant, and therefore, sliding torque can be reduced. Moreover, pumping action for sucking fluid into a portion between the sliding faces from a leakage side by a negative pressure in the negative pressure generation mechanism is obtained so that leakage can be suppressed extremely small. Further, a positive pressure is generated by a wedge effect at the first branched portion so that the sliding faces can be maintained in a fluid lubrication state. Sliding torque reduction and sealability improvement as the conflicting performances can be accomplished by the single negative pressure generation mechanism without the need for separately providing a positive pressure generation mechanism and a negative pressure generation mechanism as in the typical technique, and therefore, the sliding member can be compactified.

The sliding member according to a second aspect of the present invention is characterized by further including
a second branched portion arranged in the at least one of the sliding faces and branched from the first branched portion.

According to the second aspect, the first branched portion is further branched at the second branched portion, and therefore, the sliding member can be easily applied to equipment for rotation in both directions.

The sliding member according to a third aspect of the present invention is characterized in that
the first branched portion includes an overlap portion overlapping with an adjacent first branched portion in a circumferential direction.

According to the third aspect, the first branched portion includes the overlap portion overlapping with the adjacent first branched portion in the circumferential direction. Thus, a leakage flow from the first branched portion generating a high positive pressure to the negative pressure generation mechanism can be restricted, the use efficiency of the high positive pressure generated at the first branched portion can be enhanced, and the sliding faces can be maintained in the fluid lubrication state.

The sliding member according to a fourth aspect of the present invention is characterized in that
the second branched portion includes an overlap portion overlapping with an adjacent first branched portion in the circumferential direction.

According to the fourth aspect, the second branched portion includes the overlap portion overlapping with the adjacent first branched portion in the circumferential direction. Thus, a leakage flow from the second branched portion generating a high positive pressure to the negative pressure generation mechanism can be restricted, the use efficiency of the high positive pressure generated at the second branched portion can be enhanced, and the sliding faces can be maintained in the fluid lubrication state.

The sliding member according to a fifth aspect of the present invention is characterized in that at least the negative pressure generation mechanism includes a guide groove extending from the negative pressure generation mechanism toward the first branched portion.

According to the fifth aspect, at least fluid flowing in a bottom portion of the negative pressure generation mechanism can be guided to a desired direction by the guide groove.

The sliding member according to a sixth aspect of the present invention is characterized by further including a first branched portion extending in a clockwise direction and a first branched portion extending in a counterclockwise direction.

According to the sixth aspect, the first branched portion extending in the clockwise direction and the first branched portion extending in the counterclockwise direction are provided so that the sliding member can be easily applied to the equipment for rotation in both directions.

The sliding member according to a seventh aspect of the present invention is characterized in that an end portion of the first branched portion is a narrowed groove portion.

According to the seventh aspect, liquid flowing in the first branched portion is throttled by the narrowed groove portion of the end portion such that the pressure thereof is increased, and therefore, the fluid lubrication state in which a liquid film is interposed between the sliding faces is brought. Thus, the sliding torque can be reduced.

The sliding member according to an eighth aspect of the present invention is characterized by further including a second branched portion extending in the clockwise direction and a second branched portion extending in the counterclockwise direction.

According to the eighth aspect, the second branched portion extending in the clockwise direction and the second branched portion extending in the counterclockwise direction are provided, and therefore, the sliding member can be easily applied to the equipment for rotation in both directions.

The sliding member according to a ninth aspect of the present invention is characterized in that the second branched portion is a narrowed groove portion.

According to the ninth aspect, liquid flowing in the second branched portion is throttled by the narrowed groove portion such that the pressure thereof is increased, and therefore, the fluid lubrication state in which the liquid film is interposed between the sliding faces is brought. Thus, the sliding torque can be reduced.

The sliding member according to a tenth aspect of the present invention is characterized in that the first branched portion and the second branched portion are arranged symmetrically with respect to a radial axis connecting the center of the negative pressure generation mechanism in the circumferential direction and the center of rotation.

According to the tenth aspect, the branched portions are arranged symmetrically with respect to the radial axis, and therefore, a fluid lubrication effect and a pumping effect can be exerted regardless of forward rotation or backward rotation.

The sliding member according to an eleventh aspect of the present invention is characterized in that the negative pressure generation mechanism includes multiple negative pressure generation mechanisms arranged at the sliding face.

According to the eleventh aspect, the negative pressure generation mechanisms and the branched portions can be optimally arranged according to the size of the sliding face.

The sliding member according to a twelfth aspect of the present invention is characterized by further including a fluid introduction groove communicated with a sealed fluid side, a dynamic pressure generation mechanism communicated with the fluid introduction groove at one end and surrounded by the land portion at the other end, and an open groove provided in the land portion and communicated with the fluid introduction groove.

According to the twelfth aspect, fluid is supplied to the sliding faces from the fluid introduction groove. Thus, even when the fluid lubrication state is not sufficient in a low-speed rotation state such as start-up timing, the sliding faces S can be lubricated with the fluid supplied from the fluid introduction groove. Moreover, fluid taken into the dynamic pressure generation mechanism from the fluid introduction groove generates a high positive pressure by the wedge effect, and therefore, the sliding faces can be maintained in the fluid lubrication state.

The sliding member according to a thirteenth aspect of the present invention is characterized by further including a dynamic pressure generation mechanism extending in the clockwise direction and a dynamic pressure generation mechanism extending in the counterclockwise direction.

According to the thirteenth aspect, the dynamic pressure generation mechanism extending in the clockwise direction and the dynamic pressure generation mechanism extending in the counterclockwise direction reliably generate a high positive pressure regardless of a rotation direction, and therefore, the sliding faces can be maintained in the fluid lubrication state.

The sliding member according to a fourteenth aspect of the present invention is characterized in that the dynamic pressure generation mechanisms are arranged symmetrically with respect to the fluid introduction groove.

According to the fourteenth aspect, the dynamic pressure generation mechanisms are arranged symmetrically with respect to the fluid introduction groove, and therefore, the fluid lubrication effect and the pumping effect can be exerted regardless of forward rotation or backward rotation.

DESCRIPTION OF EMBODIMENTS

First Embodiment

Hereinafter, an exemplary mode for carrying out this invention will be described based on an embodiment with reference to the drawings. Note that unless otherwise clearly described, the dimensions, materials, shapes, relative arrangement, etc. of components described in this embodiment are not intended to limit the claims of the present invention.

A sliding member according to a first embodiment of the present invention will be described with reference to FIGS. 1 and 2. Note that in the first embodiment, a mechanical seal as one example of the sliding member will be described. In the first embodiment, an outer peripheral side of the sliding member forming the mechanical seal will be described as a sealed fluid side, and an inner peripheral side will be described as a leakage side.

Figure 1:
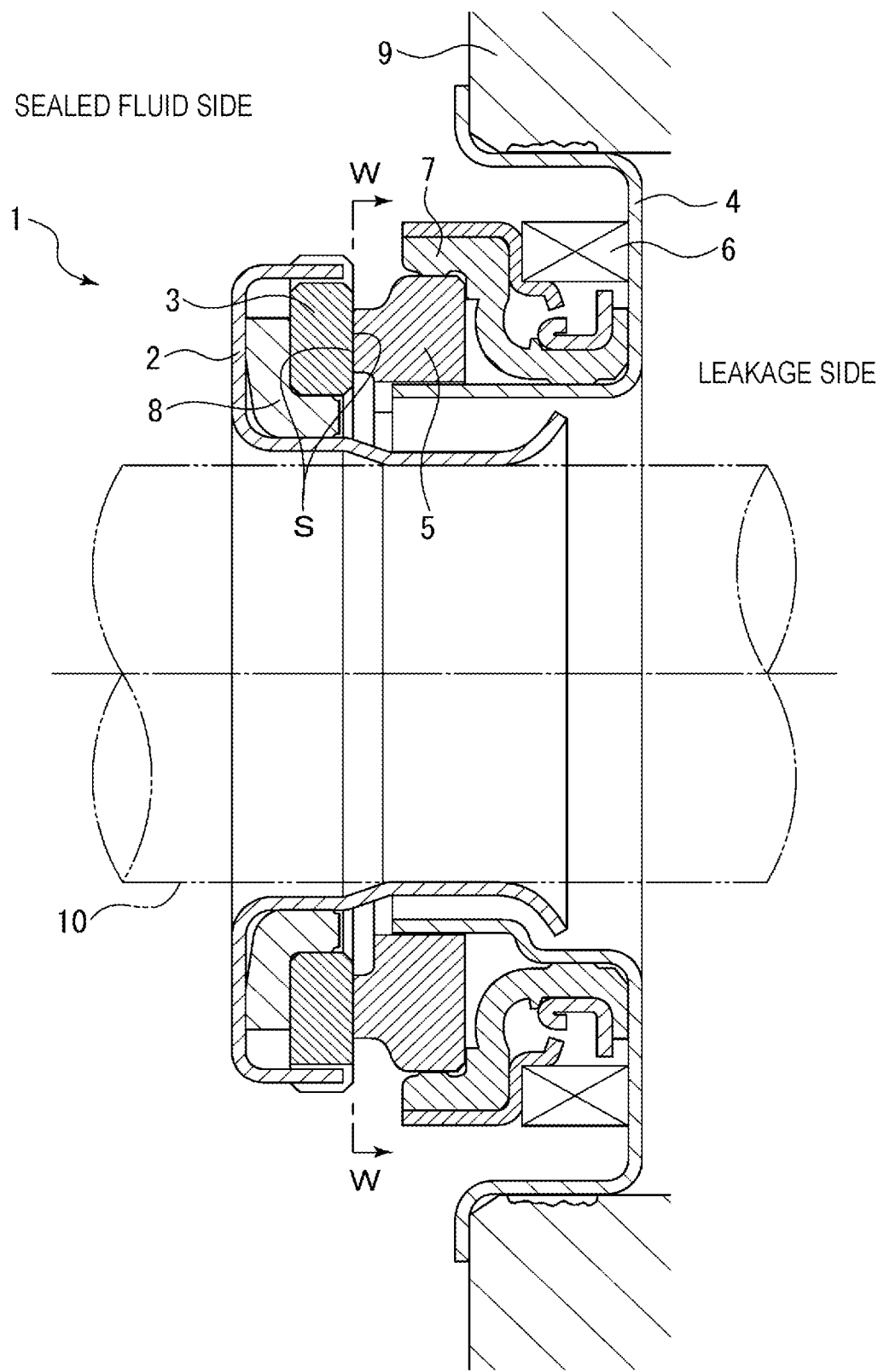
FIG. 1 is a longitudinal sectional view showing one example of a mechanical seal including sliding members according to the present invention.

FIG. 1 is a longitudinal sectional view showing one example of the mechanical seal 1, and shows an inside mechanical seal configured to seal sealed fluid tending to leak in an inner circumferential direction from the outer periphery of a sliding face and including a rotating-side cartridge and a stationary-side cartridge. The rotating-side cartridge includes a sleeve 2 fitted onto a rotary shaft 10, an annular rotating-side seal ring 3 as one sliding member, and a packing 8 configured to seal a portion between the sleeve 2 and the rotating-side seal ring 3, and rotates together with the rotary shaft 10.

The stationary-side cartridge includes a housing 4 attached to a casing 9, an annular stationary-side seal ring 5 as another sliding member, a bellows 7 configured to seal the stationary-side seal ring 5 and the housing 4, and a coiled wave spring 6 configured to bias the stationary-side seal ring 5 to a rotating-side-seal-ring-3 side through the bellows 7, and is fixed to the casing 9 in a rotation direction and an axial direction.

The mechanical seal 1 having the above-described configuration prevents outflow of the sealed fluid from the outer peripheral side to the inner peripheral side due to sliding of a sliding face S of the rotating-side seal ring 3 and a sliding face S of the stationary-side seal ring 5 on each other. Note that FIG. 1 shows a case where the width of the sliding face of the rotating-side seal ring 3 is wider than the width of the sliding face of the stationary-side seal ring 5, but the present invention is not limited to such a case. Needless to say, the present invention is also applicable to an opposite case.

The materials of the rotating-side seal ring 3 and the stationary-side seal ring 5 are selected from, e.g., silicon carbide (SiC) with excellent abrasion resistance and carbon with excellent self-lubricating properties. For example, both of these rings may be made of SiC, or a combination of the SiC rotating-side seal ring 3 and the carbon stationary-side seal ring 5 may be employed.

Figure 2:
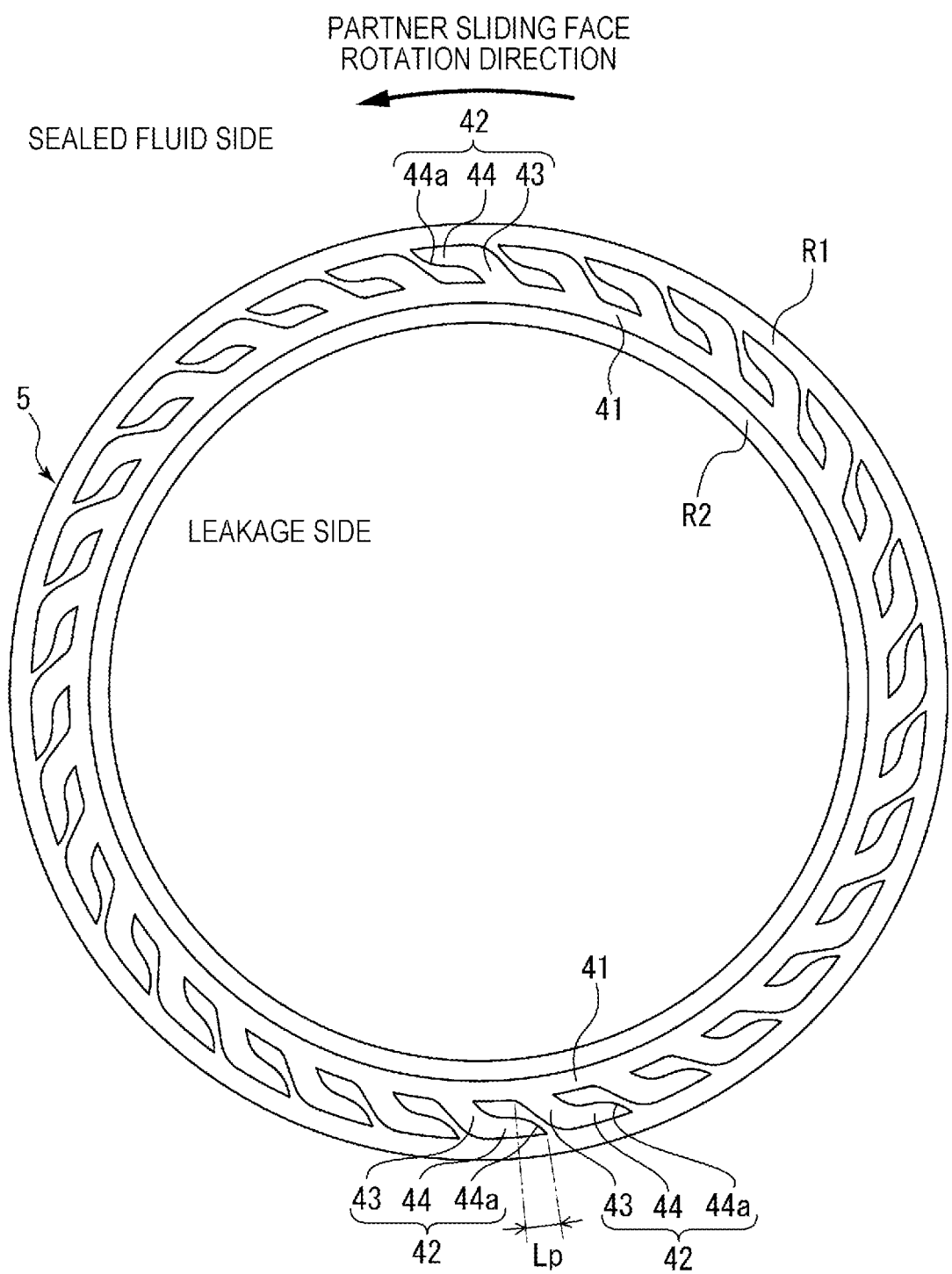
FIG. 2 is a view showing a sliding face of a sliding member of a first embodiment as viewed from a W-W arrow of FIG. 1.

As shown in FIG. 2, the leakage side of the sliding face S of the stationary-side seal ring 5 includes a negative pressure generation mechanism 41 and branched portions 42 (first branched portions according to the present invention). The negative pressure generation mechanism 41 is an annular bottomed groove portion. Moreover, the negative pressure generation mechanism 41 and the branched portions 42 are surrounded by a sealed-fluid-side land portion R1 and a leakage-side land portion R2, and are separated from the leakage side and the sealed fluid side.

The branched portion 42 includes a branched base portion 43 branched from the negative pressure generation mechanism 41 toward the sealed fluid side in a radial direction and a branched end portion 44 (an end portion according to the present invention) extending from an end portion of the branched base portion 43 in a partner sliding face rotation direction (a counterclockwise direction). The branched end portion 44 is a bottomed groove portion whose width in the radial direction is gradually narrowed toward a downstream side, and includes a narrowed step 44a surrounded by the land portions and having a depth narrowed in a stepwise manner. The branched end portion 44 has an overlap portion Lp overlapping with the adjacent branched portion 42 in a circumferential direction.

The negative pressure generation mechanism 41 and the branched portions 42 are grooves having a depth of 0.1 μm to 10 μm. The depths of the negative pressure generation mechanism 41 and the branched portions 42 may be a constant depth, or may gradually decrease toward the narrowed step 44a of the branched end portion 44. Moreover, the negative pressure generation mechanism 41 is integrally formed in an annular shape, but may be divided into multiple portions with respect to the land portion in the circumferential direction.

When a partner-side sliding member (the rotating-side seal ring 3) rotates in a predetermined direction (the counterclockwise direction in FIG. 2), fluid in the negative pressure generation mechanism 41 moves, due to viscosity thereof, to follow a movement direction of the rotating-side seal ring 3, and flows into the branched portions 42 due to centrifugal force. At this point, fluid flowing out of the negative pressure generation mechanism 41 is greater than fluid flowing into the negative pressure generation mechanism 41, and for this reason, the inside of the negative pressure generation mechanism 41 is brought into a negative pressure and cavitation occurs.

In a cavitation region, friction using gas with a small viscosity is dominant, and sliding torque can be reduced as compared to typical fluid lubrication with liquid. Moreover, the inside of the negative pressure generation mechanism 41 is under the negative pressure, and therefore, pumping action for sucking fluid into the negative pressure generation mechanism 41 from the leakage side is exerted so that leakage can be suppressed extremely small.

Even when the inside of the negative pressure generation mechanism 41 is in a cavitation state, entire fluid does not turn into gas, and a liquid flow is also present. Such liquid is heavier than gas, is gathered to a bottom portion of the negative pressure generation mechanism 41, and flows into the branched portions 42 due to influence of the centrifugal force. The fluid having flowed into the branched portion 42 flows to the downstream-side branched end portion 44, and a great positive pressure is generated by a throttle effect by the narrowed groove portion of the branched end portion 44 and a wedge effect by the narrowed step 44*a*. Such a positive pressure pushes out a portion between the sliding faces S, and a fluid lubrication state in which a liquid film is interposed between the sliding faces is brought. Thus, the sliding torque can be further reduced.

The branched end portion 44 of the branched portion 42 has the overlap portion Lp overlapping with the adjacent branched portion 42 in the circumferential direction. The centrifugal force by rotation of the rotating-side seal ring 3 and the overlap portion Lp can prevent a high pressure generated at the branched end portion 44 of the branched portion 42 from leaking to the negative pressure generation mechanism 41. Thus, the high pressure generated at the branched portion can be efficiently utilized to reliably push out the sliding faces S and maintain the fluid lubrication state.

As described above, the sliding member of the first embodiment provides the following advantageous effects.

1. Cavitation occurs inside the negative pressure generation mechanism 41. Thus, friction using gas with a small viscosity is dominant in the negative pressure generation mechanism 41, and therefore, the sliding torque can be reduced as compared to typical fluid lubrication with liquid.
2. The inside of the negative pressure generation mechanism 41 is under the negative pressure. Thus, the pumping action for sucking fluid into the negative pressure generation mechanism 41 from the leakage side is generated so that leakage can be suppressed extremely small.
3. Fluid having flowed into the branched end portion 44 from the negative pressure generation mechanism 41 through the branched base portion 43 generates a high positive pressure by the throttle effect by the narrowed groove portion of the branched end portion 44 and the wedge effect by the narrowed step 44*a*. Such a positive pressure pushes out the portion between the sliding faces S, and the fluid lubrication state in which a liquid film is interposed between the sliding faces is brought. Thus, the sliding torque can be further reduced.
4. The branched end portion 44 of the branched portion 42 has the overlap portion Lp overlapping with the adjacent branched base portion 43 in the circumferential direction, and therefore, a leakage flow from the branched end portion generating a high pressure to the negative pressure generation mechanism 41 can be restricted. Thus, a high pressure generated by the branched portion 42 can be efficiently utilized, and the fluid lubrication state between the sliding faces S can be reliably maintained.
5. Sliding torque reduction and sealability improvement as conflicting performances can be accomplished without the need for separately providing a positive pressure generation mechanism and a negative pressure generation mechanism as in a typical technique, and therefore, the sliding member can be compactified.

Second Embodiment

Figure 3:
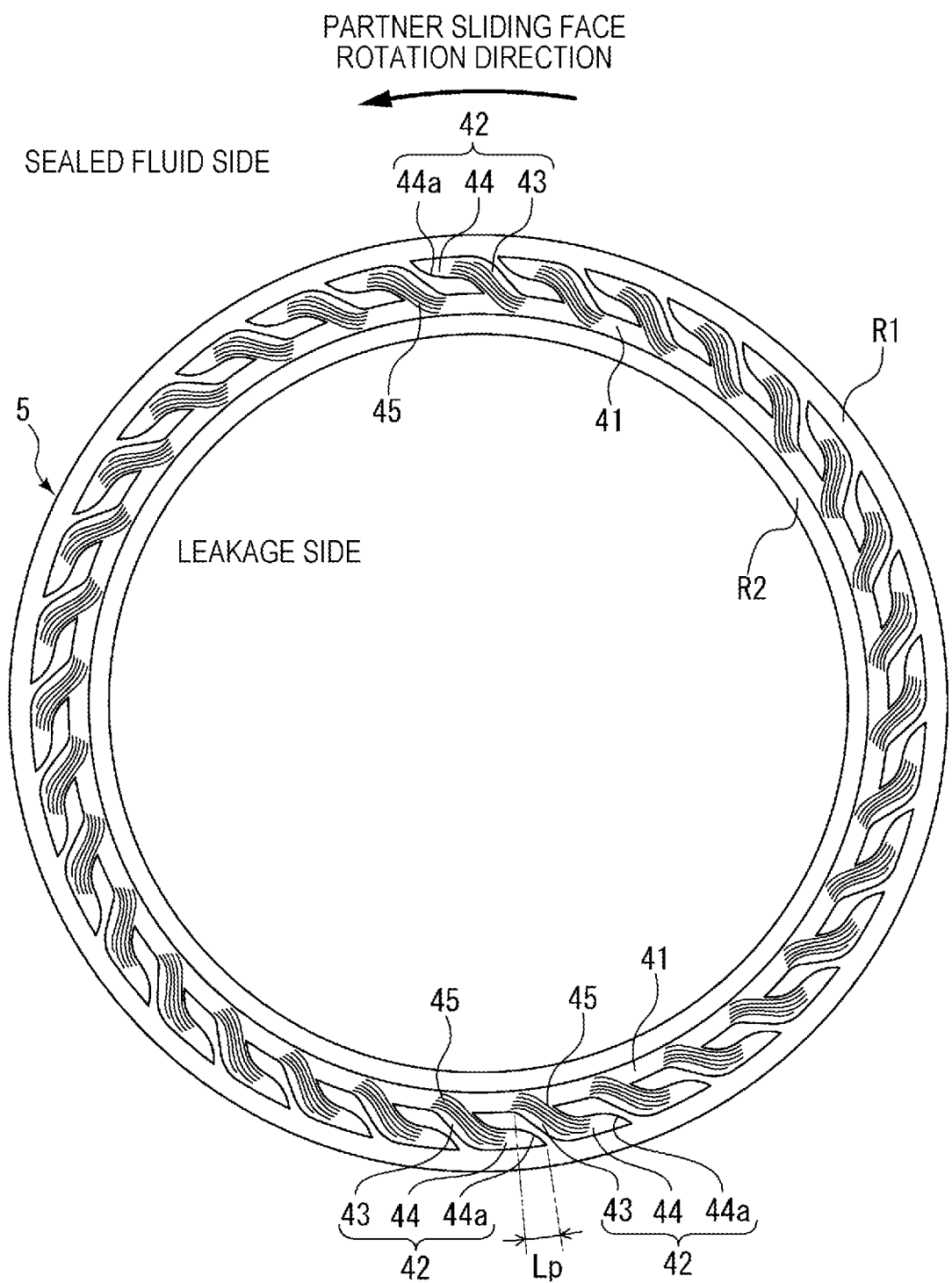
FIG. 3 is a view showing a sliding face of a sliding member of a second embodiment as viewed from the W-W arrow of FIG. 1.

A sliding member according to a second embodiment of the present invention will be described. FIG. 3 shows a sliding face S of the sliding member according to the second embodiment. FIG. 3 is different from the first embodiment in that guide grooves 45 are provided at a negative pressure generation mechanism 41 and bottom portions of branched portions 42. Hereinafter, the same reference numerals are used to represent the same members and configurations as those of the first embodiment, and overlapping description will be omitted.

As shown in FIG. 3, the negative pressure generation mechanism 41, the branched portions 42, and the guide grooves 45 are arranged on a leakage side of a sliding face S of a stationary-side seal ring 5. Moreover, the negative pressure generation mechanism 41 and the branched portions 42 are surrounded by a sealed-fluid-side land portion R1 and a leakage-side land portion R2, and are separated from the leakage side and a sealed fluid side. Configurations of the negative pressure generation mechanism 41 and the branched portion 42 are the same as those of the first embodiment.

As shown in FIG. 3, the guide groove 45 is provided at the negative pressure generation mechanism 41 and a bottom portion of a branched end portion 44 of the branched portion 42. The guide groove 45 is configured such that a predetermined number of bar-shaped grooves are arranged at predetermined intervals at the negative pressure generation mechanism 41 and the bottom portion of the branched end portion 44 of the branched portion 42, and as a whole, is arranged with a directionality from the negative pressure generation mechanism 41 toward the branched end portion 44 through the branched portion 42.

When a partner-side sliding member (a rotating-side seal ring 3) rotates in a predetermined direction (a counterclockwise direction in FIG. 3), fluid in the negative pressure generation mechanism 41 moves, due to viscosity thereof, to follow a movement direction of the rotating-side seal ring 3, and flows into the branched portions 42. At this point, fluid flowing in the branched portion 42 is greater than fluid supplied into the negative pressure generation mechanism 41, and for this reason, the inside of the negative pressure generation mechanism 41 is brought into a negative pressure and cavitation occurs.

A normal liquid flow is also present inside the negative pressure generation mechanism 41 in a cavitation state. Such liquid is heavier than gas, and is gathered to a bottom portion of the negative pressure generation mechanism 41. Thus, the guide grooves 45 are provided at the bottom portion of the negative pressure generation mechanism 41 so that the liquid can be efficiently guided from the negative pressure generation mechanism 41 to the branched portion 42. The liquid concentrated on the downstream-side branched end portion 44 of the branched portion 42 from the negative pressure generation mechanism 41 through the branched portion 42 generates a high positive pressure by a throttle effect by a narrowed groove portion of the branched end portion 44 and a wedge effect by a narrowed step 44*a*. Such a positive pressure pushes out a portion between the sliding faces S, and a fluid lubrication state in which a liquid film is interposed between the sliding faces is brought. Sliding torque can be reduced.

The guide groove 45 described herein is configured such that the predetermined number of consecutive bar-shaped grooves are arranged at the predetermined intervals to guide a flow from the negative pressure generation mechanism 41 to the branched end portion 44 of the branched portion 42, but the present invention is not limited to above. The guide grooves 45 may be independently arranged for the negative pressure generation mechanism 41, a branched base portion 43, and the branched end portion 44. For example, the guide groove 45 may be arranged in a concentrated manner at a location where a flow is concentrated at each of the negative pressure generation mechanism 41, the branched base portion 43, and the branched end portion 44 such that the flow is efficiently guided from the negative pressure generation mechanism 41 to the branched base portion 43 and the branched end portion 44. Note that the depth of the guide groove is greater than the depth of the negative pressure generation mechanism 41, and the depth of the negative pressure generation mechanism 41 is 0.1 µm to 10 µm while the guide groove is formed deeper by about 1 µm or more.

As described above, the sliding member of the second embodiment provides the following advantageous effect in addition to the first to fifth advantageous effects of the first embodiment:

the guide groove 45 arranged at the negative pressure generation mechanism 41, the branched base portion 43, and the bottom portion of the branched end portion 44 efficiently guide fluid from the negative pressure generation mechanism 41 to the branched base portion 43 and the branched end portion 44. The fluid guided to the branched end portion 44 generates a high positive pressure by a throttle effect by a narrowed groove portion of the branched end portion 44 and a wedge effect by a narrowed step 44a. Such a positive pressure pushes out the portion between the sliding faces S, and a fluid lubrication state in which a liquid film is interposed between the sliding faces is brought. Thus, sliding torque can be reduced.

Third Embodiment

Figure 4:
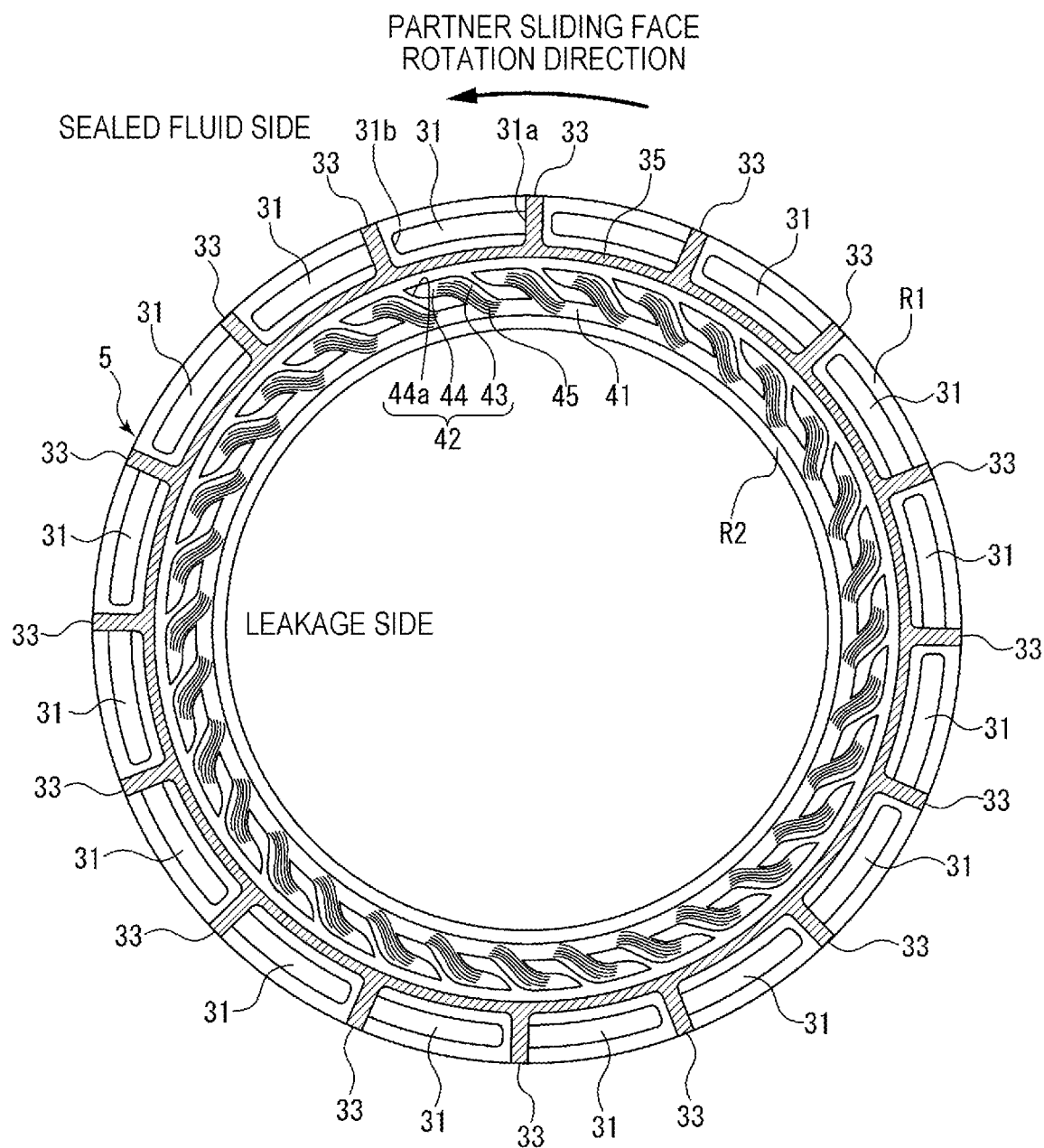
FIG. 4 is a view showing a sliding face of a sliding member of a third embodiment as viewed from the W-W arrow of FIG. 1.

A sliding member according to a third embodiment of the present invention will be described. FIG. 4 shows a sliding face S of the sliding member according to the third embodiment. FIG. 4 is different from the first embodiment in that fluid introduction grooves 33, dynamic pressure generation mechanisms 31, and an open groove 35 are provided inside a sealed-fluid-side land portion R1. Configurations of a negative pressure generation mechanism 41 and a branched portion 42 are the same as those of the first embodiment. Hereinafter, the same reference numerals are used to represent the same members and configurations as those of the first embodiment, and overlapping description will be omitted.

As shown in FIG. 4, a sliding face S of a stationary-side seal ring 5 includes the negative pressure generation mechanism 41, branched portions 42, and guide grooves 45, and includes the fluid introduction grooves 33, the dynamic pressure generation mechanisms 31, and the open groove 35 inside the sealed-fluid-side land portion R1.

In the land portion R1, the annular open groove 35 and the fluid introduction grooves 33 communicated with a sealed fluid side at one end and communicated with the open groove 35 at the other end are provided. A predetermined number (16 in the embodiment of FIG. 4) of fluid introduction grooves 33 are provided at substantially-equal intervals. Moreover, the dynamic pressure generation mechanisms 31 including groove portions are arranged in the land portion R1. The dynamic pressure generation mechanism 31 has an opening 31a communicated with the fluid introduction groove 33 at one end (an upstream-side end portion), and has a dead end portion 31b surrounded by the land portion R1 at the other end (a downstream-side end portion). Note that the dynamic pressure generation mechanism 31 is a groove having a depth of 0.1 µm to 10 µm. The depths of the fluid introduction groove 33 and the open groove 35 are about 10 to 50 times as great as that of the dynamic pressure generation mechanism 31.

Figure 5:
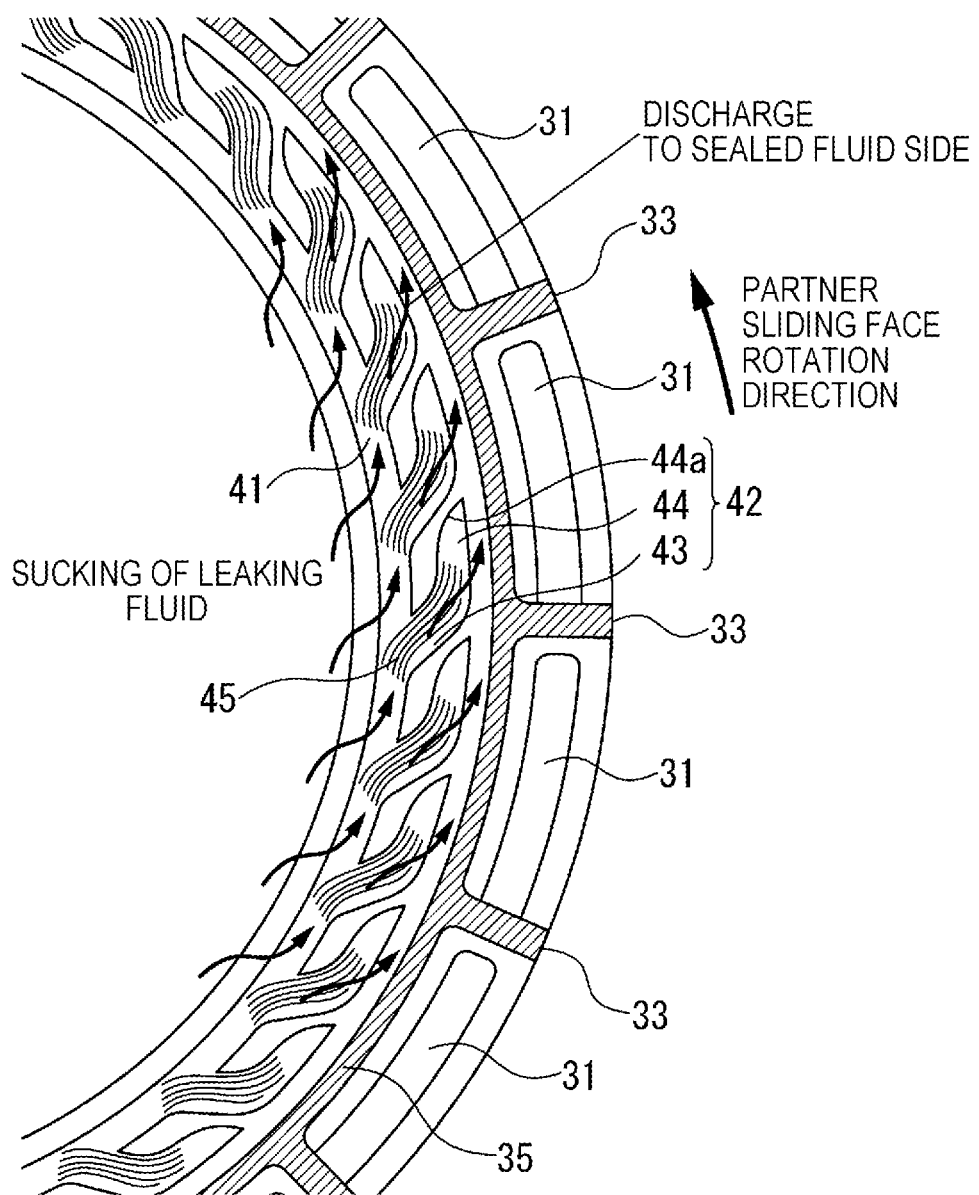
FIG. 5 is a partially-enlarged view of the sliding face of FIG. 4.

When a partner-side sliding member (a rotating-side seal ring 3) rotates in a predetermined direction (a counterclockwise direction in FIG. 4), the inside of the negative pressure generation mechanism 41 is brought into a negative pressure, and cavitation occurs. In a cavitation region, friction using gas is dominant, and therefore, sliding torque of the sliding face S can be reduced as compared to typical fluid lubrication with liquid. Moreover, the inside of the negative pressure generation mechanism 41 is under the negative pressure, and therefore, pumping action for sucking fluid into the negative pressure generation mechanism 41 from a leakage side by the negative pressure is exerted. Thus, leakage can be reduced (see FIG. 5).

The guide groove 45 provided at the negative pressure generation mechanism 41 and the branched portion 42 guide liquid in the cavitation to the branched portion 42. The liquid having guided to the branched portion 42 generates a high positive pressure by a throttle effect by a narrowed shape of a branched end portion 44 of the branched portion 42 and a wedge effect at a narrowed step 44a. Thus, the sliding faces S are pushed out so that the sliding faces S can be maintained in a fluid lubrication state.

Further, fluid taken into the dynamic pressure generation mechanism 31 from the fluid introduction groove 33 generates a high positive pressure by a wedge effect at the dead end portion 31b. Thus, the sliding faces S are pushed out so that a fluid lubrication effect for the sliding faces S can be further enhanced. Moreover, the multiple fluid introduction grooves 33 are provided such that fluid is supplied to the sliding faces S from the sealed fluid side at multiple locations. Thus, even when the fluid lubrication state is not sufficient in a low-speed rotation state such as start-up timing, the fluid supplied from the fluid introduction grooves 33 can lubricate the sliding faces S.

In addition, the open groove 35 is provided between the dynamic pressure generation mechanism 31 and each of the negative pressure generation mechanism 41 and the branched portion 42. The open groove 35 has the function of releasing a dynamic pressure (a positive pressure) generated in the dynamic pressure generation mechanism 31 to the same level as a pressure on the sealed fluid side and the function of releasing the positive pressure generated by the wedge effect at the narrowed step 44a of the branched end portion 44. With this configuration, high-pressure fluid from the dynamic pressure generation mechanism 31 flows into the negative pressure generation mechanism 41, and therefore, weakening of a pumping effect of the negative pressure generation mechanism 41 can be prevented and interference between the positive pressure generation function of the dynamic pressure generation mechanism 31 and the positive pressure generation function of the branched portion 42 can be prevented (see FIG. 5).

As described above, the sliding member of the third embodiment provides the following advantageous effects in addition to the first to fourth advantageous effects of the first embodiment and the advantageous effect of the second embodiment.

1. In the dynamic pressure generation mechanism 31, fluid taken from the fluid introduction groove 33 can generate a high positive pressure by the wedge effect at the dead end portion 31b. Thus, the sliding faces S are pushed out so that the fluid lubrication effect for the sliding faces S can be further enhanced.
2. The multiple fluid introduction grooves 33 are provided such that fluid is supplied to the sliding faces S from the sealed fluid side at the multiple locations. Thus, even when the fluid lubrication state is not sufficient in the low-speed rotation state such as the start-up timing, the fluid supplied from the fluid introduction grooves 33 can lubricate the sliding faces S.

3. The open groove 35 releases the dynamic pressure (the positive pressure) generated in the dynamic pressure generation mechanisms 31. Thus, high-pressure fluid flows into the negative pressure generation mechanism 41 from the dynamic pressure generation mechanisms 31, and therefore, weakening of the pumping effect of the negative pressure generation mechanism 41 can be prevented and interference between the positive pressure generation function of the dynamic pressure generation mechanism 31 and the positive pressure generation function of the branched portion 42 can be prevented.

The shapes of the branched portions 42 are all the same in the first to third embodiments, but the present invention is not limited to above. The sizes, shapes, or depths of all branched portions 42 may be different from each other, or the sizes, shapes, or depths of some of the branched portions 42 may be different from each other.

Fourth Embodiment

Figure 6:
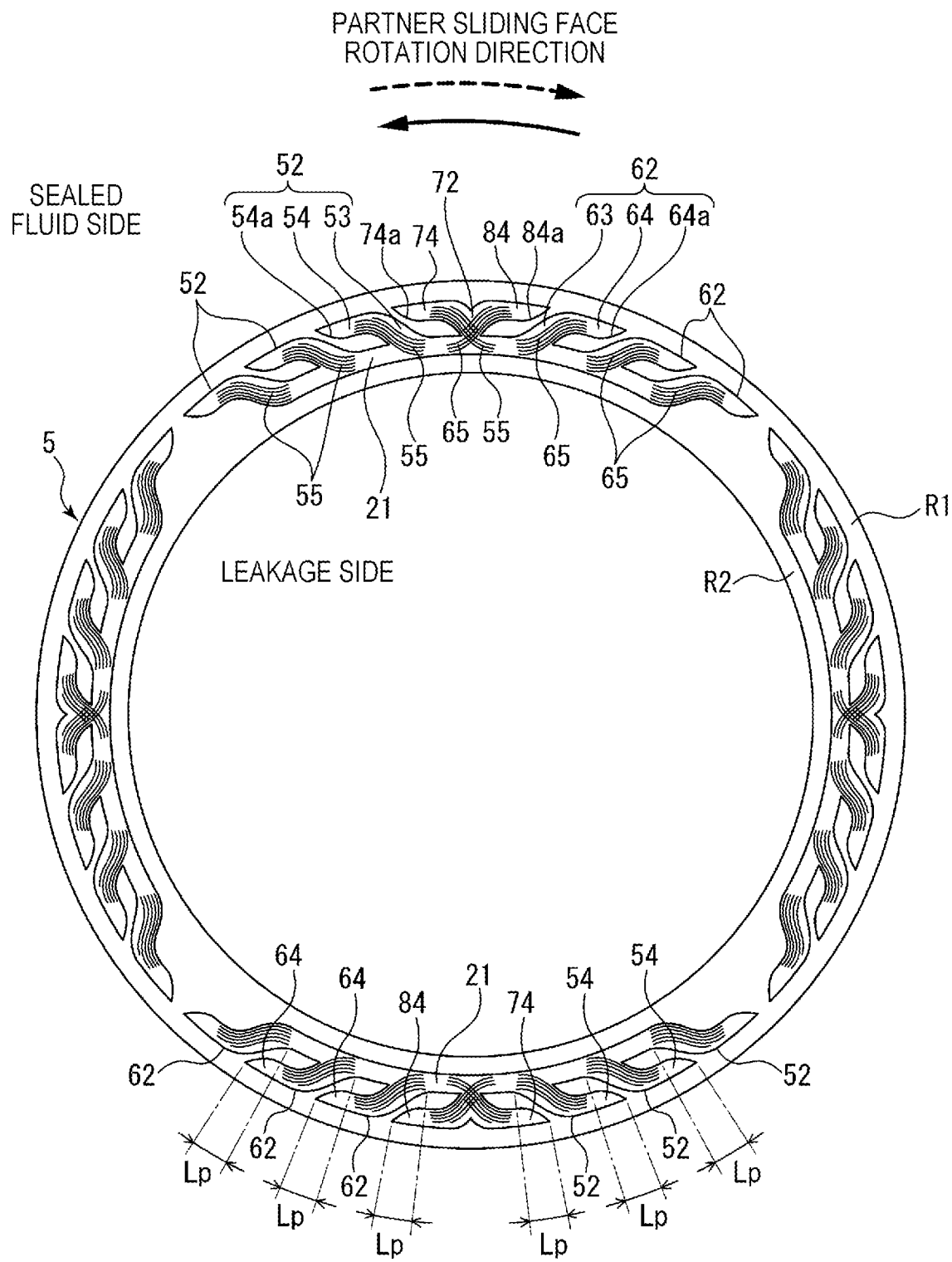
FIG. 6 is a view showing a sliding face of a sliding member of a fourth embodiment as viewed from the W-W arrow of FIG. 1.

A sliding member according to a fourth embodiment of the present invention will be described. FIG. 6 shows the sliding member of the fourth embodiment suitable for rotation in both directions, whereas the first to third embodiments have described the sliding members suitable for rotation in one direction. Hereinafter, the same reference numerals are used to represent the same members and configurations as those of the first to third embodiments, and overlapping description will be omitted.

As shown in FIG. 6, a leakage side of a sliding face S of a stationary-side seal ring 5 includes negative pressure generation mechanisms 21, first branched portions 52, 62, 72, and second branched portions 74, 84. The negative pressure generation mechanism 21 is an annular bottomed groove portion. Moreover, a predetermined number (four in the embodiment of FIG. 6) of configurations including the negative pressure generation mechanism 21, the first branched portions 52, 62, 72, and the second branched portions 74, 84 are arranged through land portions. The negative pressure generation mechanisms 21, the first branched portions 52, 62, 72, and the second branched portions 74, 84 are surrounded by a sealed-fluid-side land portion R1 and a leakage-side land portion R2, and are separated from a leakage side and a sealed fluid side. Further, guide grooves 55, 65 are provided at the negative pressure generation mechanism 21 and bottom portions of the first branched portions 52, 62, 72 and the second branched portions 74, 84.

The first branched portion 52 includes a branched base portion 53 branched from the negative pressure generation mechanism 21 toward the sealed fluid side in a radial direction and a branched end portion 54 (an end portion according to the present invention) extending from an end portion of the branched base portion 53 in a counterclockwise direction. Moreover, the first branched portion 62 includes a branched base portion 63 branched from the negative pressure generation mechanism 21 toward the sealed fluid side in the radial direction and a branched end portion 64 (an end portion according to the present invention) extending from an end portion of the branched base portion 63 in a clockwise direction. The branched end portions 54, 64 are groove portions whose widths in the radial direction are gradually narrowed, and include narrowed steps 54a, 64a surrounded by the land portions and having depths narrowed in a stepwise manner. A predetermined number (three in the embodiment of the FIG. 6) of each of the first branched portions 52, 62 are provided in the single negative pressure generation mechanism 21.

Moreover, the first branched portion 72 branched from the negative pressure generation mechanism 21 toward the sealed fluid side in the radial direction is arranged between the first branched portion 52 and the first branched portion 62. The second branched portion 74 branched from an end portion of the first branched portion 72 in the counterclockwise direction and the second branched portion 84 branched from an end portion of the first branched portion in the clockwise direction are provided. The second branched portions 74, 84 are narrowed bottomed groove portions whose widths in the radial direction are gradually narrowed, and at end portions thereof, include narrowed steps 74a, 84a surrounded by the land portions and having depths narrowed in a stepwise manner.

The negative pressure generation mechanism 21, the first branched portions 52, 62, 72, and the second branched portions 74, 84 are grooves having depths of 0.1 μm to 10 μm. The depths of the negative pressure generation mechanism 21 and the branched portions 52, 62, 72, 74, 84 may be constant depths, or the branched end portions 54, 64 and the second branched portions 74, 84 may be gradually decreased toward the narrowed steps.

The first branched portions 52, 62 have overlap portions Lp each overlapping with the adjacent first branched portions 52, 62 in a circumferential direction. Moreover, the second branched portions 74, 84 have overlap portions Lp each overlapping with the adjacent first branched portions 52, 62 in the circumferential direction.

The guide grooves 55, 65 are provided at the negative pressure generation mechanism 21 and the bottom portions of the first branched portions 52, 62, 72 and the second branched portions 74, 84. A predetermined number of guide grooves 55, 65 are provided at the negative pressure generation mechanism 21 and the bottom portions of the first branched portions 52, 62, 72 and the second branched portions 74, 84, and as a whole, have a directionality from the negative pressure generation mechanism 21 toward tip end portions of the branched end portions 54, 64 and the second branched portions 74, 84.

When a partner-side sliding member (a rotating-side seal ring 3) rotates in the counterclockwise direction, fluid in the negative pressure generation mechanism 21 moves, due to viscosity thereof, to follow a movement direction of the rotating-side seal ring 3, and flows into the first branched portion 52. At this point, a flow from the first branched portion 62 to the negative pressure generation mechanism 21 is extremely small because of great influence of centrifugal force by rotation of the rotating-side seal ring 3. Thus, fluid flowing into the first branched portion 52 is greater than fluid supplied into the negative pressure generation mechanism 21, and the inside of the negative pressure generation mechanism 21 is brought into a negative pressure and cavitation occurs. In a cavitation region, friction using gas is dominant, and sliding torque of a sliding face S can be reduced as compared to typical fluid lubrication with liquid.

A liquid flow is also normally present inside the negative pressure generation mechanism 21 in a cavitation state. Such liquid is heavier than gas, and is gathered to a bottom portion of the negative pressure generation mechanism 21. Thus, the liquid can be efficiently guided from the negative pressure generation mechanism 21 to the first branched portions 52, 62, 72 and the second branched portions 74, 84 by the guide grooves 55, 65 provided at the negative pressure generation mechanism 21 and the bottom portions of the first branched portions 52, 62, 72 and the second branched portions 74, 84. The liquid guided from the negative pressure generation mechanism 21 to the first branched portions 52, 62, 72 and the second branched portions 74, 84 generates a high positive pressure by a throttle effect by narrowed shapes of the branched end portions 54, 64 and the second branched portions 74, 84 and a wedge effect by the narrowed steps 54*a*, 64*a*, 74*a*, 84*a*. Such a positive pressure pushes out the sliding faces S, and the sliding faces S can be maintained in a fluid lubrication state.

By the overlap portions Lp of the first branched portions 52, 62 each overlapping with the adjacent first branched portions 52, 62 in the circumferential direction and the overlap portions Lp of the second branched portions 74, 84 each overlapping with the adjacent first branched portions 52, 62 in the circumferential direction, the branched end portions 54, 64 and the second branched portions 74, 84 having a high pressure do not directly face the negative pressure generation mechanism 21. This can prevent high-pressure fluid from directly flowing into the negative pressure generation mechanism 21. With this configuration, a high positive pressure generated at the branched portions can be efficiently utilized to reliably maintain the fluid lubrication state of the sliding faces S.

The first branched portion 52 having the branched end portion 54 extending in the counterclockwise direction and the first branched portion 62 having the branched end portion extending in the clockwise direction are arranged symmetrically with respect to a radial axis connecting the center of the negative pressure generation mechanism 21 in the circumferential direction and the center of rotation. Similarly, the second branched portion 74 extending in the counterclockwise direction and the second branched portion 84 extending in the clockwise direction are also arranged symmetrically with respect to the radial axis connecting the center of the negative pressure generation mechanism 21 in the circumferential direction and the center of rotation. With this configuration, not only in a case where the rotating-side seal ring 3 rotates in the counterclockwise direction but also in a case where the rotating-side seal ring 3 rotates in the clockwise direction, the negative pressure generation mechanism 21 can exert pumping action for sucking fluid into the negative pressure generation mechanism 21 from the leakage side by the negative pressure, and the first branched portion 52, the first branched portion 62, the second branched portion 74, and the second branched portion 84 can generate a high pressure to exert a fluid lubrication effect.

As described above, the sliding member of the fourth embodiment provides the following advantageous effects.

1. The negative pressure generation mechanism 21 generates the negative pressure, and the inside of the negative pressure generation mechanism 21 becomes the cavitation region. Thus, in the negative pressure generation mechanism 21, friction using gas is dominant, and therefore, the sliding torque can be reduced as compared to typical fluid lubrication with liquid.
2. The inside of the negative pressure generation mechanism 21 is under the negative pressure, and therefore, the pumping action for sucking fluid into the negative pressure generation mechanism 21 from the leakage side can be exerted and leakage can be reduced accordingly.
3. The guide grooves 55, 65 provided at the negative pressure generation mechanism 21 and the bottom portions of the first branched portions 52, 62, 72 and the second branched portions 74, 84 can efficiently guide liquid to the first branched portions 52, 62, 72 and the second branched portions 74, 84 from the negative pressure generation mechanism 21.
4. The liquid guided to the first branched portions 52, 62, 72 and the second branched portions 74, 84 from the negative pressure generation mechanism 21 generates a high positive pressure by the throttle effect by the narrowed shapes of the branched end portions 54, 64 and the second branched portions 74, 84 and the wedge effect by the narrowed steps 54*a*, 64*a*, 74*a*, 84*a*. Such a positive pressure pushes out the sliding faces S, and the sliding faces S can be maintained in the fluid lubrication state.
5. The first branched portions 52, 62 and the second branched portions 74, 84 have the overlap portions Lp each overlapping with the adjacent first branched portions 52, 62 in the circumferential direction. By the overlap portions Lp, the branched end portions 54, 64 and the second branched portions 74, 84 generating a high pressure do not directly face the negative pressure generation mechanism 21. This can prevent fluid having a high pressure from directly flowing into the negative pressure generation mechanism 21. With this configuration, a high positive pressure generated at the branched portion can be efficiently utilized to reliably maintain the fluid lubrication state of the sliding faces S.
6. The first branched portion 52 and the first branched portion 62 are arranged symmetrically with respect to the radial axis connecting the center of the negative pressure generation mechanism 21 in the circumferential direction and the center of rotation, and the second branched portion 74 and the second branched portion 84 are arranged symmetrically with respect to the radial axis connecting the center of the negative pressure generation mechanism 21 in the circumferential direction and the center of rotation. With this configuration, the above-described first to fifth advantageous effects can be provided regardless of a rotation direction.
7. Sliding torque reduction and sealability improvement as conflicting performances can be accomplished by the single negative pressure generation mechanism without the need for separately providing a positive pressure generation mechanism and a negative pressure generation mechanism as in a typical technique, and therefore, the sliding member can be compactified.

Note that in the fourth embodiment, the example where the guide grooves are arranged at the negative pressure generation mechanism 21 and the bottom portions of the first branched portions 52, 62, 72 and the second branched portions 74, 84 has been described, but the guide grooves are not necessarily provided as in the first embodiment.

Fifth Embodiment

Figure 7:
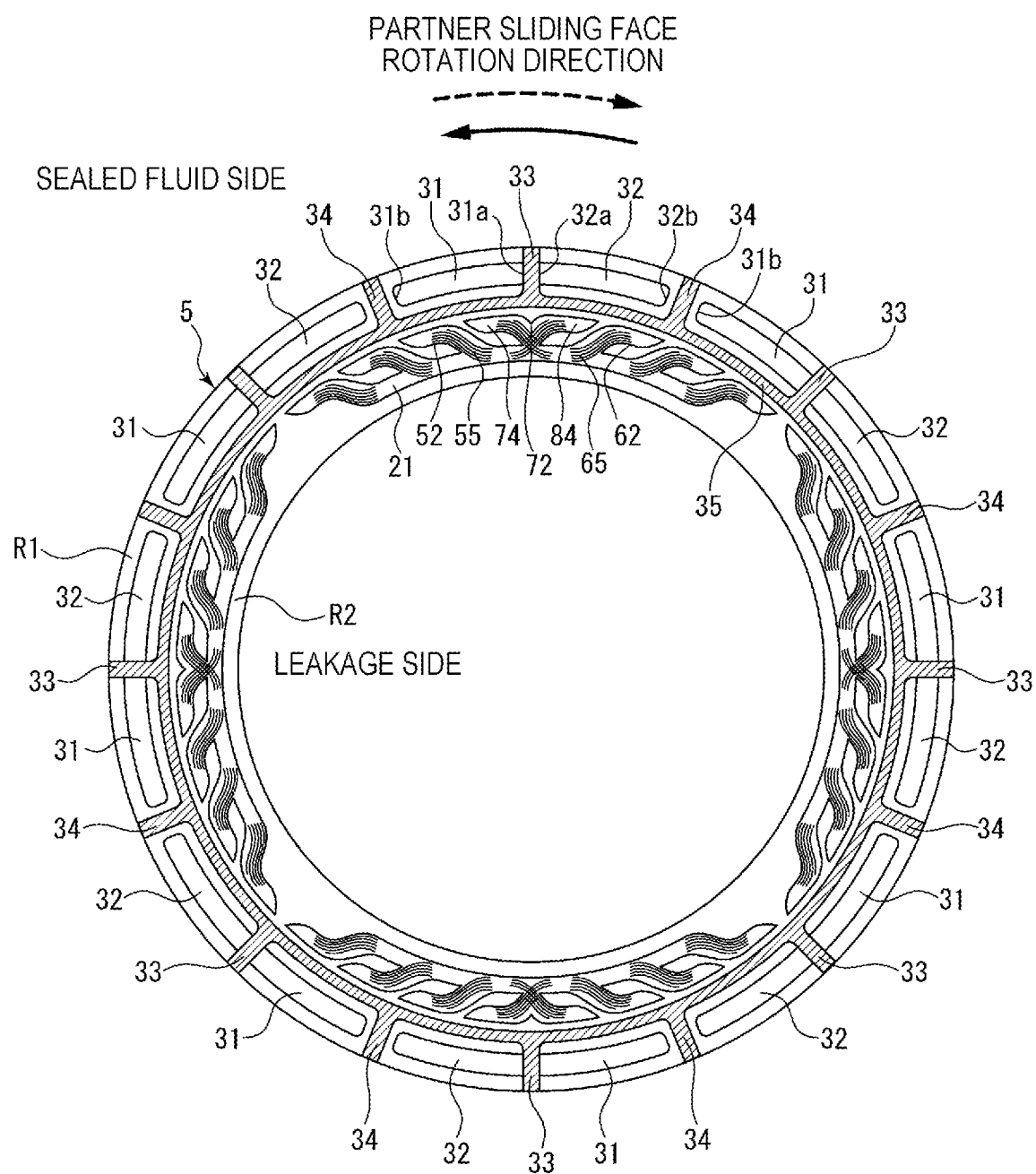
FIG. 7 is a view showing a sliding face of a sliding member of a fifth embodiment as viewed from the W-W arrow of FIG. 1.

A sliding member according to a fifth embodiment of the present invention will be described. FIG. 7 shows a sliding face S of the sliding member according to the fifth embodiment, and is different from the fourth embodiment in that fluid introduction grooves 33, 34, dynamic pressure generation mechanisms 31, 32, and an open groove 35 are provided in a sealed-fluid-side land portion R1. Configurations of a negative pressure generation mechanism 21, first branched portions 52, 62, 72, second branched portions 74, 84, and guide grooves 55, 65 are the same as those of the fourth embodiment. Hereinafter, the same reference numerals are used to represent the same members and configurations as those of the fourth embodiment, and overlapping description will be omitted.

As shown in FIG. 7, a sliding face S of a stationary-side seal ring 5 includes the negative pressure generation mechanisms 21, the first branched portions 52, 62, 72, the second branched portions 74, 84, and the guide grooves 55, 65 in a leakage-side land portion R2, and includes the fluid introduction grooves 33, 34, the dynamic pressure generation mechanisms 31, 32, and the open groove 35 in the sealed-fluid-side land portion R1. The negative pressure generation mechanisms 21, the first branched portions 52, 62, 72, the second branched portions 74, 84, and the guide grooves 55, 65 are surrounded by the leakage-side land portion R2, and are separated from a sealed fluid side and a leakage side. Note that the configurations of the negative pressure generation mechanism 21, the first branched portions 52, 62, 72, the second branched portions 74, 84, and the guide grooves 55, 65 are the same as those of the fourth embodiments, and therefore, description will be omitted.

In the sealed-fluid-side land portion R1, the annular open groove 35 and the fluid introduction grooves 33, 34 communicated with the sealed fluid side at one end and communicated with the open groove 35 at the other end are provided. A predetermined number (eight each in the embodiment of FIG. 7) of the fluid introduction grooves 33, 34 are alternately provided at substantially-equal intervals. Moreover, the dynamic pressure generation mechanisms 31, 32 are provided in the land portion R1, and include groove portions communicated with the fluid introduction groove 33 through openings 31a, 32a at one end and having dead end portions 31b, 32b surrounded by the land portion R1 at the other end. The fluid introduction groove 33 is communicated with the sealed fluid side and the open groove 35, and is communicated with the dynamic pressure generation mechanisms 31, 32. On the other hand, the fluid introduction groove 34 is only communicated with the sealed fluid side and the open groove 35, and is not communicated with the dynamic pressure generation mechanisms 31, 32.

Note that each of the dynamic pressure generation mechanisms 31, 32 is a groove having a depth of 0.1 μm to 10 μm. The depths of the fluid introduction grooves 33, 34 and the open groove 35 are about 10 to 50 times as great as those of the dynamic pressure generation mechanisms 31, 32.

When a partner-side sliding member (a rotating-side seal ring 3) rotates in a counterclockwise direction, fluid taken into the dynamic pressure generation mechanism 31 from the fluid introduction groove 33 generates a high positive pressure by a wedge effect at the dead end portion 31b. With this configuration, the sliding faces S can be pushed out, and a fluid lubrication effect of the sliding faces S can be further enhanced. Moreover, the multiple fluid introduction grooves 33, 34 are provided, and therefore, fluid is supplied to the sliding faces S from the sealed fluid side at multiple locations. Thus, even when a fluid lubrication state is not sufficient in a low-speed rotation state such as start-up timing, the fluid supplied from the fluid introduction grooves 33, 34 can contribute to lubrication of the sliding faces S.

The dynamic pressure generation mechanism 31 extending in the counterclockwise direction and the dynamic pressure generation mechanism 32 extending in a clockwise direction are formed symmetrically with respect to the fluid introduction groove 33. Thus, even when the rotating-side seal ring 3 rotates in any of the clockwise direction and the counterclockwise direction, the sliding faces S are pushed out, and the fluid lubrication state in which a liquid film is interposed between the sliding faces S is brought. Consequently, sliding torque can be reduced.

Figure 8:
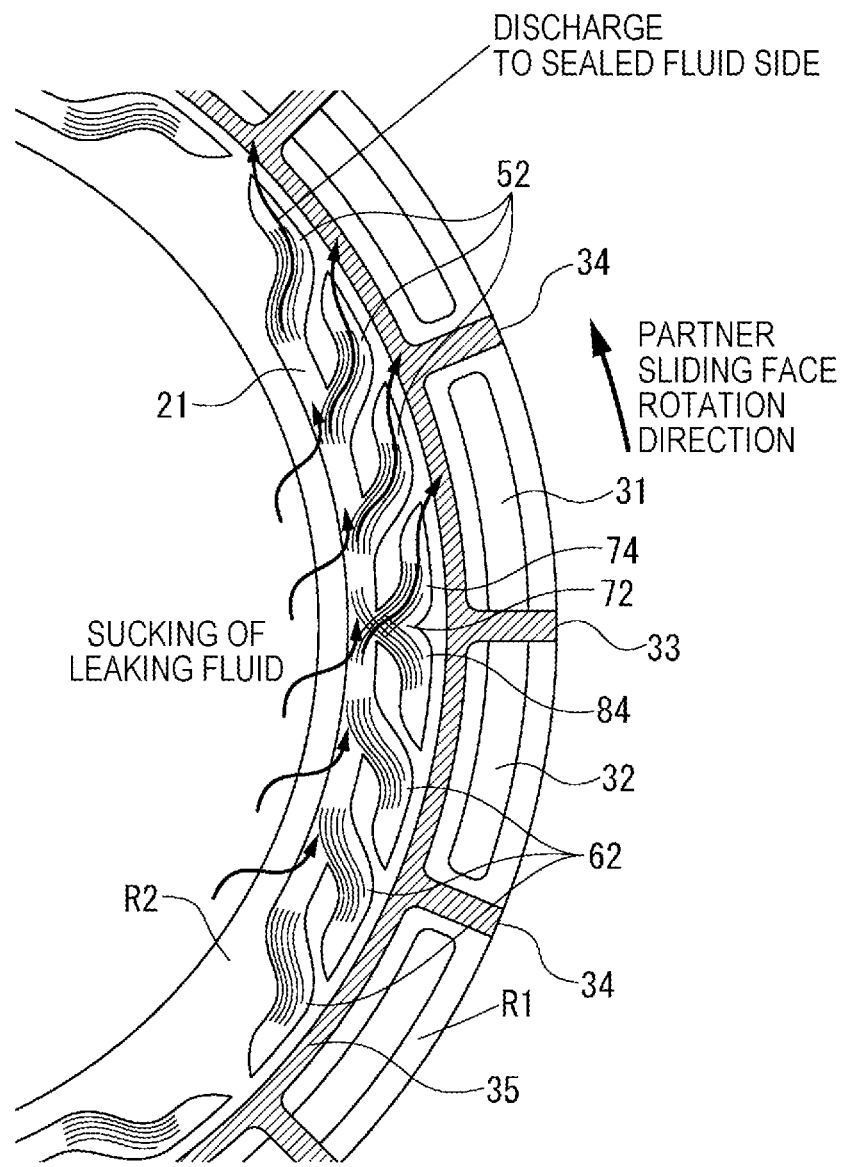
FIG. 8 is a partially-enlarged view of the sliding face of FIG. 7.

In addition, the open groove 35 is provided among the dynamic pressure generation mechanisms 31, 32, the negative pressure generation mechanism 21, the first branched portions 52, 62, 72, and the second branched portions 74, 84. The open groove 35 has the function of releasing a dynamic pressure (a positive pressure) generated in the dynamic pressure generation mechanisms 31, 32 to the same level as a pressure on the sealed fluid side and the function of guiding, to the open groove 35, a high positive pressure generated by the wedge effect in the first branched portions 52, 62, 72 and the second branched portions 74, 84 to release the positive pressure to a high-pressure fluid side. With this configuration, high-pressure fluid from the dynamic pressure generation mechanisms 31, 32 flows into the negative pressure generation mechanism 21, and therefore, weakening of a pumping effect of the negative pressure generation mechanism 21 can be prevented and interference between the positive pressure generation function of the dynamic pressure generation mechanisms 31, 32 and the positive pressure generation function of the first branched portion 52 can be prevented (see FIG. 8).

As described above, the sliding member of the fifth embodiment provides the following advantageous effects in addition to the first to sixth advantageous effects of the fourth embodiment.

1. The multiple fluid introduction grooves 33, 34 are provided, and therefore, fluid is supplied to the sliding faces S from the sealed fluid side at the multiple locations. Thus, even when the fluid lubrication state is not sufficient in the low-speed rotation state such as the start-up timing, the fluid supplied from the fluid introduction grooves 33, 34 can contribute to lubrication of the sliding faces S.

2. In the dynamic pressure generation mechanisms 31, 32, fluid taken from the fluid introduction groove 33 generates a high positive pressure by the wedge effect at the dead end portion 31b. Thus, the sliding faces S are pushed out, and the fluid lubrication state in which the liquid film is interposed between the sliding faces S is brought. Consequently, the sliding torque can be reduced.

3. The dynamic pressure generation mechanisms 31, 32 are formed symmetrically with respect to the fluid introduction groove 33, and therefore, a high positive pressure can be reliably generated even when the rotating-side seal ring 3 rotates in any of forward and backward directions.

4. The open groove 35 releases, to the high-pressure fluid side, a positive pressure generated in the dynamic pressure generation mechanisms 31, 32 and a high positive pressure generated in the first branched portions 52, 62, 72 and the second branched portions 74, 84. Thus, high-pressure fluid from the dynamic pressure generation mechanisms 31, 32 flows into the negative pressure generation mechanism 21, and therefore, weakening of the pumping effect of the negative pressure generation mechanism 21 can be prevented and interference between the positive pressure generation function of the dynamic pressure generation mechanisms 31, 32 and the positive pressure generation function of the first branched portions 52, 62, 72 and the second branched portions 74, 84 can be prevented.

Note that the example where the guide grooves are arranged at the negative pressure generation mechanism 21 and the bottom portions of the first branched portions 52, 62, 72 and the second branched portions 74, 84 has been described, but the guide grooves are not necessarily provided as in the first embodiment.

Moreover, the dynamic pressure generation mechanism 31 extending in the counterclockwise direction and the dynamic pressure generation mechanism 32 extending in the clockwise direction are arranged symmetrically with respect to the fluid introduction groove 33, but the present invention is not limited to above. The dynamic pressure generation mechanism 31 and the dynamic pressure generation mechanism 32 may have different shapes, sizes, and depths. The dynamic pressure generation mechanism 31 and the dynamic pressure generation mechanism 32 may be arranged shifted from the fluid introduction groove 33 in a radial direction.

Sixth Embodiment

Figure 9:
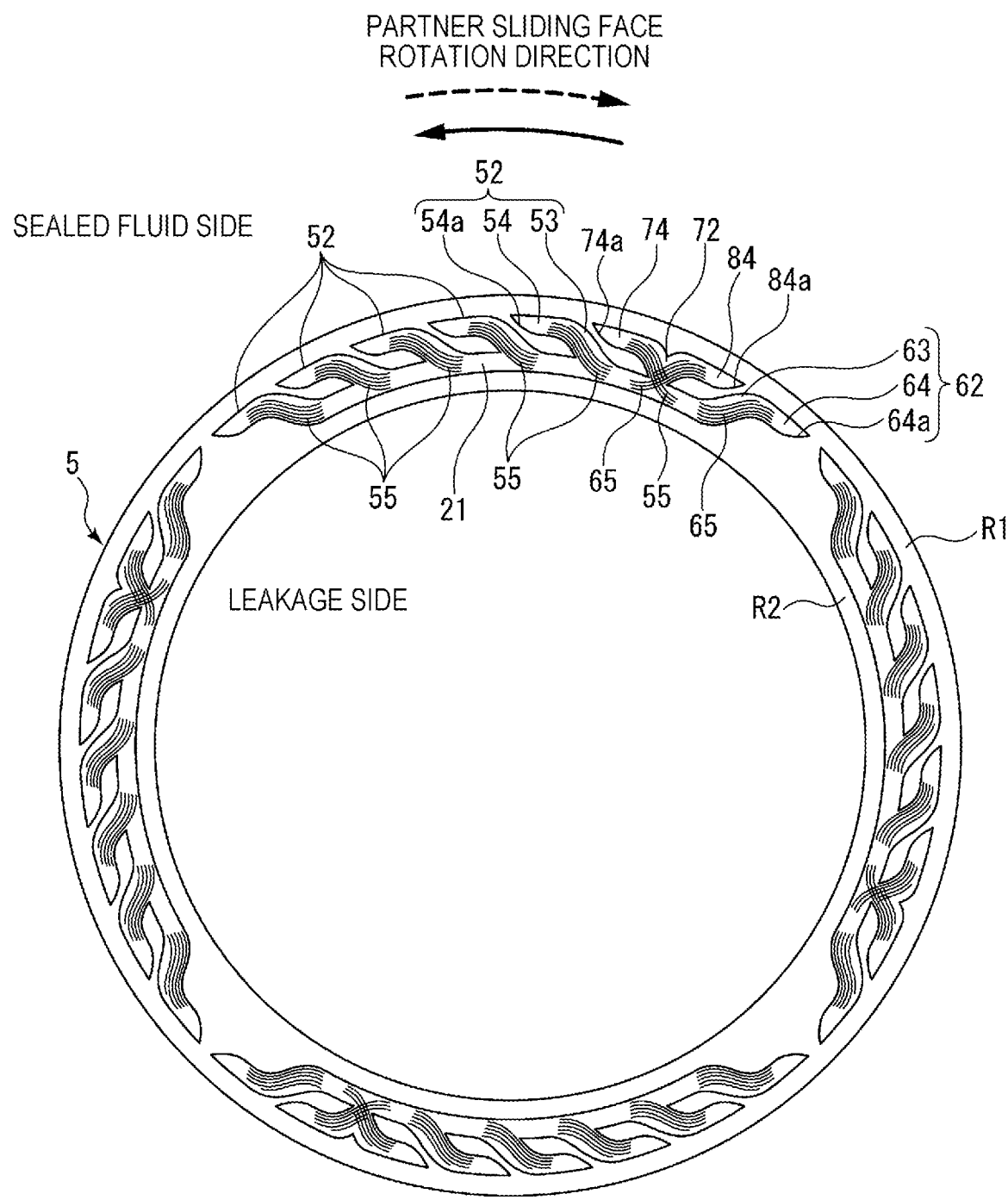
FIG. 9 is a view showing a sliding face of a sliding member of a sixth embodiment as viewed from the W-W arrow of FIG. 1.

A sliding member according to a sixth embodiment of the present invention will be described. FIG. 9 shows a sliding face S of the sliding member according to the sixth embodiment. The sliding members according to the fourth embodiment and the fifth embodiment of the present invention are configured such that the number of first branched portions 52 extending in the counterclockwise direction and the number of first branched portions 62 extending in the clockwise direction are the same as each other, but the sixth embodiment is different from these embodiments in that the number of first branched portions 52 and the number of first branched portions 62 are different from each other. Configurations of a negative pressure generation mechanism 21, first branched portions 52, 62, 72, second branched portions 74, 84, and guide grooves 55, 65 are the same as those of the fourth embodiment. Hereinafter, the same reference numerals are used to represent the same members and configurations as those of the fourth embodiment, and overlapping description will be omitted.

As shown in FIG. 9, a leakage side of a sliding face S of a stationary-side seal ring 5 includes the negative pressure generation mechanisms 21, the first branched portions 52, 62, 72, and the second branched portions 74, 84. The negative pressure generation mechanism 21 is an annular bottomed groove portion. Moreover, a predetermined number (four in the embodiment of FIG. 9) of configurations including the negative pressure generation mechanism 21, the first branched portions 52, 62, 72, and the second branched portions 74, 84 are arranged through land portions at the sliding face S. The negative pressure generation mechanisms 21, the first branched portions 52, 62, 72, and the second branched portions 74, 84 are surrounded by a sealed-fluid-side land portion R1 and a leakage-side land portion R2, and are separated from the leakage side and a sealed fluid side. Further, guide grooves 55, 65 are provided at the negative pressure generation mechanism 21 and bottom portions of the first branched portions 52, 62, 72 and the second branched portions 74, 84.

The first branched portion 52 includes a branched base portion 53 branched from the negative pressure generation mechanism 21 toward the sealed fluid side in a radial direction and a branched end portion 54 (an end portion according to the present invention) extending from an end portion of the branched base portion 53 in a counterclockwise direction. Moreover, the first branched portion 62 includes a branched base portion 63 branched from the negative pressure generation mechanism 21 toward the sealed fluid side in the radial direction and a branched end portion 64 (an end portion according to the present invention) extending from an end portion of the branched base portion 63 in a clockwise direction. A predetermined number (five in the embodiment of the FIG. 9) of first branched portions 52 and a predetermined number (one in the embodiment of the FIG. 9) of first branched portions 62 are arranged in the single negative pressure generation mechanism 21.

Moreover, the first branched portion 72 branched from the negative pressure generation mechanism 21 toward the sealed fluid side in the radial direction is arranged between the first branched portion 52 and the first branched portion 62. The single second branched portion 74 branched from an end portion of the first branched portion 72 in the counterclockwise direction and the single second branched portion 84 branched from an end portion of the first branched portion 72 in the clockwise direction are provided.

In the present embodiment, the number of first branched portions 52 extending in the counterclockwise direction is greater than the number of first branched portions 62 extending in the clockwise direction. With this configuration, a sliding member suitable for equipment having a higher frequency of use in the counterclockwise direction and a lower frequency of use in the clockwise direction can be provided. a percentage between the number of first branched portions 52 extending in the counterclockwise direction and the number of first branched portions 62 extending in the clockwise direction can be determined according to specific use conditions.

Moreover, according to the frequency of use in a rotation direction, the first branched portion 52 extending in the counterclockwise direction and the first branched portion 62 extending in the clockwise direction may have different sizes, shapes, and depths, or the first branched portions 52 or the first branched portions 62 may have different shapes, sizes, and depths.

Similarly, according to the frequency of use in the rotation direction, the second branched portion 74 extending in the counterclockwise direction and the second branched portion 84 extending in the clockwise direction may have different numbers, sizes, shapes, and depths.

Further, the intensity of a fluid lubrication function can vary according to the rotation direction. For example, when the numbers of first branched portions 52 and second branched portions 74 extending in the counterclockwise direction are greater than the first branched portions 62 and the second branched portions 84 extending in the clockwise direction, the fluid lubrication function can be more enhanced in rotation in the counterclockwise direction than in rotation in the clockwise direction.

Note that in the sixth embodiment, the example where the guide grooves are arranged at the negative pressure generation mechanism 21 and the bottom portions of the first branched portions 52, 62, 72 and the second branched portions 74, 84 has been described, but the guide grooves are not necessarily provided as in the first embodiment.

The embodiments of the present invention have been described above with reference to the drawings, but specific configurations are not limited to these embodiments. Even changes and additions made without departing from the gist of the present invention are included in the present invention.

In the above-described embodiments, the outer peripheral side has been described as the sealed fluid side, and the inner peripheral side has been described as the leakage side. However, the present invention is not limited to above, and is also applicable to a case where the inner peripheral side is the sealed fluid side and the outer peripheral side is the leakage side.

The negative pressure generation mechanism, the land portion, and the guide groove are provided at the sliding face S of the stationary-side seal ring 5, but may be provided at the sliding face of the rotating-side seal ring 3.

REFERENCE SIGNS LIST 1 mechanical seal
2 sleeve
3 rotating-side seal ring
4 housing
5 stationary-side seal ring
6 coiled wave spring
7 bellows
8 packing
9 casing
10 rotary shaft
21 negative pressure generation mechanism
31 dynamic pressure generation mechanism
31*a* opening
31*b* dead end portion
32 dynamic pressure generation mechanism
32*a* opening
32*b* dead end portion
33 fluid introduction groove
34 fluid introduction groove
35 open groove
37 second branched portion
41 negative pressure generation mechanism
42 branched portion (first branched portion)
43 branched base portion
44 branched end portion (end portion)
44*a* narrowed step
45 guide groove
52 first branched portion
53 branched base portion
54 branched end portion (end portion)
54*a* narrowed step
55 guide groove
62 first branched portion
63 branched base portion
64 branched end portion (end portion)
65 guide groove
64*a* narrowed step
72 first branched portion
74 second branched portion
74*a* narrowed step
84 second branched portion
84*a* narrowed step
Lp overlap portion
R1 sealed-fluid-side land portion
R2 leakage-side land portion
S sliding face

The invention claimed is:

1. A pair of sliding members sliding relative to each other at sliding faces, wherein
at least one of the sliding faces includes
a negative pressure generation groove configured to extend continuously in the circumferential direction surrounded by a land portion, and
a plurality of first branched portions arranged in the at least one of the sliding faces and branched arranged to be adjacent each other in the circumferential direction from the negative pressure generation groove.

2. The sliding members according to claim 1, further comprising:
a second branched portion arranged in the at least one of the sliding faces and branched from the first branched portion.

3. The sliding members according to claim 2, wherein
the first branched portion includes an overlap portion overlapping with an adjacent first branched portion in a circumferential direction.

4. The sliding members according to claim 3, wherein characterized in that
the second branched portion includes an overlap portion configured to overlap with an adjacent first branched portion in the circumferential direction.

5. The sliding members according to claim 3, wherein
at least the negative pressure generation mechanism includes a guide groove configured to extend from the negative pressure generation mechanism toward the first branched portion.

6. The sliding members according to claim 3, wherein
the first branched portion is configured to extend in a clockwise direction; and
the first branched portion is configured to extend in a counterclockwise direction.

7. The sliding members according to claim 3, characterized by further comprising:
the second branched portion is configured to extend in the clockwise direction; and
the second branched portion is configured to extend in the counterclockwise direction.

8. The sliding members according to claim 3, wherein
the first branched portion and the second branched portion are arranged symmetrically with respect to a radial axis connecting a center of the negative pressure generation mechanism in the circumferential direction and a center of rotation.

9. The sliding members according to claim 3, wherein
the negative pressure generation mechanism includes multiple negative pressure generation mechanisms arranged at the sliding face.

10. The sliding members according to claim 2, wherein
the second branched portion includes an overlap portion overlapping with an adjacent first branched portion in the circumferential direction.

11. The sliding members according to claim 2, wherein
at least the negative pressure generation mechanism includes a guide groove extending from the negative pressure generation mechanism toward the first branched portion.

12. The sliding members according to claim 2, further comprising:
the first branched portion is configured to extend in a clockwise direction; and
the first branched portion is configured to extend in a counterclockwise direction.

13. The sliding members according to claim 12, wherein
an end portion of the first branched portion is a narrowed groove portion.

14. The sliding members according to claim 2, further comprising:
the second branched portion is configured to extend in the clockwise direction; and
the second branched portion is configured to extend in the counterclockwise direction.

15. The sliding members according to claim 14, wherein
the second branched portion is a narrowed groove portion.

16. The sliding members according to claim 2, wherein the first branched portion and the second branched portion are arranged symmetrically with respect to a radial axis connecting a center of the negative pressure generation mechanism in the circumferential direction and a center of rotation.

17. The sliding members according to claim 2, wherein the negative pressure generation mechanism includes multiple negative pressure generation mechanisms arranged at the sliding face.

18. The sliding members according to claim 2, further comprising:
a fluid introduction groove configured to communicate with a sealed fluid side;
a dynamic pressure generation mechanism configured to communicate with the fluid introduction groove at one end and surrounded by the land portion at the other end; and
an open groove provided in the land portion and configured to communicate with the fluid introduction groove.

19. The sliding members according to claim 18, further comprising:
a dynamic pressure generation mechanism is configured to extend in the clockwise direction; and
a dynamic pressure generation mechanism is configured to extend in the counterclockwise direction.

20. The sliding members according to claim 18, wherein the dynamic pressure generation mechanisms are arranged symmetrically with respect to the fluid introduction groove.

21. A pair of sliding members sliding relative to each other at sliding faces, wherein
at least one of the sliding faces includes
a negative pressure generation mechanism surrounded by a land portion, and
a plurality of first branched portions arranged in the at least one of the sliding faces and branched adjacent each other-in the circumferential direction from the negative pressure generation mechanism,
the first branched portion includes an overlap portion overlapping with an adjacent first branched portion in a circumferential direction.

* * * * *